(12) United States Patent
Lipscomb et al.

(10) Patent No.: US 6,206,673 B1
(45) Date of Patent: *Mar. 27, 2001

(54) PLASTIC LENS AND PLASTIC LENS MANUFACTURING SYSTEM

(75) Inventors: N. Thornton Lipscomb; Omar M. Buazza, both of Louisville, KY (US)

(73) Assignee: Ophthalmic Research Group International, Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/454,523

(22) Filed: May 30, 1995

Related U.S. Application Data

(60) Division of application No. 07/425,371, filed on Oct. 26, 1989, which is a continuation-in-part of application No. 07/273,428, filed on Nov. 18, 1988, now Pat. No. 4,879,318, which is a continuation-in-part of application No. 07/021,913, filed on Mar. 4, 1987, now abandoned, which is a continuation-in-part of application No. 06/823,339, filed on Jan. 28, 1986, now Pat. No. 4,728,469.

(51) Int. Cl.⁷ ...................................................... B29D 11/00
(52) U.S. Cl. .................... 425/174.4; 264/1.32; 264/1.38; 425/407; 425/446; 425/808; 522/183
(58) Field of Search ................................. 425/72.1, 72.2, 425/174.4, 808, 552, 547, 407, 555, 378.1, 384, 446; 264/1.32, 1.38, 22, 24; 522/183

(56) References Cited

U.S. PATENT DOCUMENTS

| | | |
|---|---|---|
| 1,518,405 | 12/1924 | Glancy . |
| 2,193,742 | 3/1940 | Rohm et al. . |
| 2,370,565 | 2/1945 | Muskat et al. . |
| 2,370,567 | 2/1945 | Muskat et al. . |
| 2,379,218 | 6/1945 | Dial et al. . |
| 2,384,115 | 9/1945 | Muskat et al. . |
| 2,403,112 | 7/1946 | Muskat . |
| 2,403,113 | 7/1946 | Muskat et al. . |
| 2,455,653 | 12/1948 | Bralley et al. . |
| 2,455,662 | 12/1948 | Bralley et al. . |
| 2,479,522 | 8/1949 | Strain . |
| 2,479,935 | 8/1949 | Johnson . |
| 2,524,862 | 10/1950 | White . |
| 2,525,664 | 10/1950 | Gadsby et al. . |
| 2,529,866 | 11/1950 | Carlson . |
| 2,529,867 | 11/1950 | Carlson . |
| 2,542,386 | 2/1951 | Beattie . |
| 2,542,827 | 2/1951 | Minter . |
| 2,547,696 | 4/1951 | Foster . |
| 2,548,141 | 4/1951 | Bralley . |
| 2,568,658 | 9/1951 | Pope . |
| 2,587,437 | 2/1952 | Bralley et al. . |
| 2,587,442 | 2/1952 | Carlson . |
| 2,964,501 | 12/1960 | Sarofeen . |
| 3,038,210 | 6/1962 | Hungerford et al. . |
| 3,070,846 | 1/1963 | Schrier . |

(List continued on next page.)

FOREIGN PATENT DOCUMENTS

| | | |
|---|---|---|
| 1244593 | 11/1988 | (CA) . |
| 1 629 263 | 1/1971 | (DE) . |
| 2060 976 | 6/1972 | (DE) . |

(List continued on next page.)

OTHER PUBLICATIONS

International Search Report dated Mar. 2, 1990.
Examiner's First Report on Canadian Patent Application 46219/89 dated Jul. 31, 1991.
Brochure from PPG Industries—HIRI Casting Resin "The New HIRI High–Index Casting Resin from PPG".

(List continued on next page.)

*Primary Examiner*—James P. Mackey
(74) *Attorney, Agent, or Firm*—Conley, Rose & Tayon, P.C.

(57) ABSTRACT

System for making a plastic lens. Mold members are spaced apart to define a mold cavity. Ultraviolet light is directed against at least one of the mold members to cure a composition and form a substantially clear eyeglass lens in less than one hour.

33 Claims, 3 Drawing Sheets

U.S. PATENT DOCUMENTS

| | | |
|---|---|---|
| 3,171,869 | 3/1965 | Weinberg . |
| 3,210,297 | 10/1965 | Fischer et al. . |
| 3,222,432 | 12/1965 | Grandperret . |
| 3,248,460 | 4/1966 | Naujokas . |
| 3,278,654 | 10/1966 | Grandperret . |
| 3,306,712 | 2/1967 | Forber . |
| 3,320,344 | 5/1967 | Slipp . |
| 3,364,291 | 1/1968 | Deichert et al. . |
| 3,364,525 | 1/1968 | Davy et al. . |
| 3,422,168 | 1/1969 | Bowser . |
| 3,423,488 | 1/1969 | Bowser . |
| 3,452,124 | 6/1969 | Knapp . |
| 3,465,076 | 9/1969 | Asami et al. . |
| 3,469,254 | 9/1969 | Wichterle . |
| 3,497,577 | 2/1970 | Wichterle . |
| 3,503,942 | 3/1970 | Seiderman . |
| 3,518,341 | 6/1970 | Haryu . |
| 3,551,235 | 12/1970 | Bassemir . |
| 3,557,249 | 1/1971 | Dannels et al. . |
| 3,605,195 | 9/1971 | Campbell . |
| 3,660,545 | 5/1972 | Wichterle . |
| 3,720,827 | 3/1973 | Hemphill . |
| 3,745,042 | 7/1973 | Lim et al. . |
| 3,779,995 | 12/1973 | Dannels et al. . |
| 3,806,079 | 4/1974 | Beattie . |
| 3,808,178 | 4/1974 | Gaylord . |
| 3,844,916 | 10/1974 | Gaske . |
| 3,872,042 | 3/1975 | Bond . |
| 3,914,165 | 10/1975 | Gaske . |
| 3,915,609 | 10/1975 | Robinson . |
| 3,916,033 | 10/1975 | Merrill . |
| 3,925,349 | 12/1975 | Gaske . |
| 3,938,775 | 2/1976 | Sarofeen . |
| 3,953,115 | 4/1976 | French et al. . |
| 3,955,035 | 5/1976 | Ito et al. . |
| 3,970,417 | 7/1976 | Page . |
| 3,971,872 | 7/1976 | LeBoeuf . |
| 3,978,178 | 8/1976 | Oshima et al. . |
| 3,989,609 | 11/1976 | Brack . |
| 3,991,234 | 11/1976 | Chang et al. . |
| 4,014,771 | 3/1977 | Rosenkranz et al. . |
| 4,022,855 | 5/1977 | Hamblen . |
| 4,031,163 | 6/1977 | Vollkommer et al. . |
| 4,041,120 | 8/1977 | Oshima et al. . |
| 4,064,308 | 12/1977 | Laurin . |
| 4,069,168 | 1/1978 | Leatherman et al. . |
| 4,071,424 | 1/1978 | Dart et al. . |
| 4,091,050 | 5/1978 | McDonald . |
| 4,095,772 | 6/1978 | Weber . |
| 4,113,224 | 9/1978 | Clark et al. . |
| 4,120,570 | 10/1978 | Gaylord . |
| 4,126,527 | 11/1978 | Kaufman . |
| 4,127,697 | 11/1978 | Laurin . |
| 4,132,518 | 1/1979 | Rips . |
| 4,138,538 | 2/1979 | Kaetsu et al. . |
| 4,139,177 * | 2/1979 | Hanning ............................ 425/552 |
| 4,139,578 | 2/1979 | Baughman et al. . |
| 4,139,692 | 2/1979 | Tanaka et al. . |
| 4,144,262 | 3/1979 | Stevens . |
| 4,146,696 | 3/1979 | Bond et al. . |
| 4,152,508 | 5/1979 | Ellis et al. . |
| 4,164,099 | 8/1979 | Grant . |
| 4,166,088 | 8/1979 | Neefe . |
| 4,181,627 | 1/1980 | Weiher et al. . |
| 4,191,717 | 3/1980 | Weber . |
| 4,191,804 | 3/1980 | Weber . |
| 4,197,226 | 4/1980 | Clark et al. . |
| 4,199,421 | 4/1980 | Kamada et al. . |
| 4,202,226 | 5/1980 | Becker et al. . |
| 4,205,154 | 5/1980 | Stevens . |
| 4,217,433 | 8/1980 | Dyball . |
| 4,227,950 | 10/1980 | Spycher . |
| 4,246,207 | 1/1981 | Spycher . |
| 4,251,474 | 2/1981 | Blandin . |
| 4,252,753 | 2/1981 | Rips . |
| 4,257,988 | 3/1981 | Matos et al. . |
| 4,260,564 | 4/1981 | Baiocchi et al. . |
| 4,273,799 | 6/1981 | Kamada et al. . |
| 4,273,809 | 6/1981 | LaLiberte et al. . |
| 4,298,005 | 11/1981 | Mutzhas . |
| 4,306,780 | 12/1981 | Tarumi et al. . |
| 4,306,954 | 12/1981 | Wendling et al. . |
| 4,308,400 | 12/1981 | Felder et al. . |
| 4,310,642 | 1/1982 | Margotte et al. . |
| 4,311,762 | 1/1982 | Spycher et al. . |
| 4,313,355 | 2/1982 | Becker et al. . |
| 4,327,045 * | 4/1982 | Nishikawa et al. ............. 425/DIG. 9 |
| 4,342,863 | 8/1982 | Hohokabe et al. . |
| 4,345,546 | 8/1982 | Weber . |
| 4,346,197 | 8/1982 | Crano et al. . |
| 4,347,302 | 8/1982 | Gotman . |
| 4,360,637 | 11/1982 | Schwarz . |
| 4,369,298 | 1/1983 | Kida et al. . |
| 4,376,800 | 3/1983 | Lu et al. . |
| 4,378,250 | 3/1983 | Treadway et al. . |
| 4,382,902 | 5/1983 | Feurer . |
| 4,390,482 | 6/1983 | Feurer . |
| 4,408,016 | 10/1983 | Eads et al. . |
| 4,416,837 | 11/1983 | Neefe . |
| 4,417,790 | 11/1983 | Dawson et al. . |
| 4,432,832 | 2/1984 | Fantone . |
| 4,440,699 | 4/1984 | Smid et al. . |
| 4,440,909 | 4/1984 | Crano et al. . |
| 4,441,795 | 4/1984 | Lobdell . |
| 4,447,468 | 5/1984 | Keable . |
| 4,455,322 | 6/1984 | Weber . |
| 4,476,162 | 10/1984 | Ireland . |
| 4,487,904 | 12/1984 | Fukuda et al. . |
| 4,490,495 | 12/1984 | Weber . |
| 4,497,754 | 2/1985 | Padoan . |
| 4,506,951 | 3/1985 | Yamada . |
| 4,512,340 | 4/1985 | Buck . |
| 4,518,756 | 5/1985 | Yoshida et al. . |
| 4,522,768 | 6/1985 | Roscrow et al. . |
| 4,528,351 | 7/1985 | Tarumi et al. . |
| 4,534,915 | 8/1985 | Neefe . |
| 4,536,267 | 8/1985 | Ito et al. . |
| 4,537,732 | 8/1985 | Ueda et al. . |
| 4,542,201 | 9/1985 | Kanemura et al. . |
| 4,543,146 | 9/1985 | Petcen . |
| 4,544,572 | 10/1985 | Sandvig et al. . |
| 4,547,397 | 10/1985 | Burzynski et al. . |
| 4,551,361 | 11/1985 | Burzynski et al. . |
| 4,556,605 | 12/1985 | Mogami et al. . |
| 4,561,951 | 12/1985 | Neckers . |
| 4,586,996 | 5/1986 | Shinshara . |
| 4,589,231 | 5/1986 | Roberts . |
| 4,590,248 | 5/1986 | Moriya et al. . |
| 4,594,288 | 6/1986 | Dobigny et al. . |
| 4,607,087 | 8/1986 | Moriya et al. . |
| 4,609,267 | 9/1986 | Deguchi et al. . |
| 4,613,656 | 9/1986 | Tang . |
| 4,620,954 | 11/1986 | Singer et al. . |
| 4,622,376 | 11/1986 | Misura et al. . |
| 4,623,497 * | 11/1986 | Waters ............................. 425/552 |

| | | |
|---|---|---|
| 4,623,708 | 11/1986 | Ezrielev et al. . |
| 4,632,773 | 12/1986 | Neefe . |
| 4,636,212 | 1/1987 | Posin et al. . |
| 4,637,698 | 1/1987 | Kwak et al. . |
| 4,640,805 | 2/1987 | Neefe . |
| 4,643,537 | 2/1987 | Vance . |
| 4,655,005 | 4/1987 | Roberts . |
| 4,663,183 | 5/1987 | Ovshinsky et al. . |
| 4,666,976 | 5/1987 | Misura . |
| 4,668,751 | 5/1987 | Nakamoto et al. . |
| 4,676,610 | 6/1987 | Barkan et al. . |
| 4,686,266 | 8/1987 | Tang . |
| 4,693,446 | 9/1987 | Orlosky . |
| 4,695,399 | 9/1987 | Neefe . |
| 4,701,288 | 10/1987 | Cook et al. . |
| 4,702,574 | 10/1987 | Bawa . |
| 4,721,377 | 1/1988 | Fukuda et al. . |
| 4,728,469 | 3/1988 | Danner et al. . |
| 4,732,715 | 3/1988 | Bawa et al. . |
| 4,737,447 | 4/1988 | Suzuki et al. . |
| 4,742,133 | 5/1988 | Tang et al. . |
| 4,745,168 | 5/1988 | Nakamoto et al. . |
| 4,746,716 | 5/1988 | Oates . |
| 4,756,972 | 7/1988 | Kloosterboer et al. . |
| 4,757,129 | 7/1988 | Oates . |
| 4,758,448 | 7/1988 | Sandvig et al. . |
| 4,774,035 | 9/1988 | Carmelite et al. . |
| 4,774,282 | 9/1988 | Quershi . |
| 4,775,733 | 10/1988 | Kanemura et al. . |
| 4,783,361 | 11/1988 | Ovshinsky et al. . |
| 4,789,318 | 12/1988 | Ehritt . |
| 4,791,185 | 12/1988 | Kanemura et al. . |
| 4,792,224 | 12/1988 | Kwiatkowski et al. . |
| 4,795,461 | 1/1989 | Lindqvist et al. . |
| 4,800,123 | 1/1989 | Boeckeler . |
| 4,801,667 | 1/1989 | Brand . |
| 4,803,254 | 2/1989 | Dunks et al. . |
| 4,808,652 | 2/1989 | Gardner . |
| 4,812,032 | 3/1989 | Fukuda et al. . |
| 4,812,598 | 3/1989 | Chen . |
| 4,816,584 | 3/1989 | Kwak et al. . |
| 4,820,747 | 4/1989 | Chen . |
| 4,822,864 | 4/1989 | Chen . |
| 4,829,136 | 5/1989 | Oates . |
| 4,836,960 | 6/1989 | Spector et al. . |
| 4,837,289 | 6/1989 | Mueller et al. . |
| 4,839,109 | 6/1989 | Kaetsu et al. . |
| 4,842,782 | 6/1989 | Portney et al. . |
| 4,846,913 | 7/1989 | Frieder et al. . |
| 4,861,823 | 8/1989 | Qureshi . |
| 4,871,821 | 10/1989 | Stenzenberger et al. . |
| 4,873,029 | 10/1989 | Blum . |
| 4,874,561 | 10/1989 | Spector . |
| 4,874,828 | 10/1989 | Lukacs . |
| 4,879,318 * | 11/1989 | Lipscomb et al. ............ 522/42 |
| 4,880,667 | 11/1989 | Welch . |
| 4,892,403 | 1/1990 | Merle . |
| 4,895,102 | 1/1990 | Kachel et al. . |
| 4,902,725 * | 2/1990 | Moore ............ 522/42 |
| 4,904,525 | 2/1990 | Taniguchi et al. . |
| 4,911,538 | 3/1990 | Robb . |
| 4,912,185 | 3/1990 | Toh . |
| 4,919,850 | 4/1990 | Blum et al. . |
| 4,929,707 | 5/1990 | Nagata et al. . |
| 4,931,220 | 6/1990 | Haynes et al. . |
| 4,931,523 | 6/1990 | Watanabe et al. . |
| 4,936,995 | 6/1990 | Kwiatkowski . |
| 4,946,923 | 8/1990 | Nagata et al. . |
| 4,948,447 | 8/1990 | Clarke et al. . |
| 4,950,041 | 8/1990 | Robb . |
| 4,955,804 | 9/1990 | Martell et al. . |
| 4,959,429 * | 9/1990 | Misura ............ 526/230.5 |
| 4,979,888 | 12/1990 | Bauer et al. . |
| 4,983,335 | 1/1991 | Matsuo et al. . |
| 4,988,274 | 1/1991 | Kenmochi . |
| 5,135,686 | 8/1992 | Masuhara et al. . |
| 5,164,228 | 11/1992 | Peralta et al. . |
| 5,210,553 | 5/1993 | Barth et al. . |
| 5,246,499 | 9/1993 | Peralta et al. . |
| 5,248,529 | 9/1993 | Hammond et al. . |
| 5,364,256 * | 11/1994 | Lipscomb et al. ............ 425/174.4 |
| 5,406,341 | 4/1995 | Blum et al. . |

FOREIGN PATENT DOCUMENTS

| | | |
|---|---|---|
| 27 34 416 | 2/1978 | (DE) . |
| 3428 645 A1 | 2/1985 | (DE) . |
| 37 15412 A1 | 11/1992 | (DE) . |
| 0 028 975 | 5/1981 | (EP) . |
| 0 095 121 A2 | 5/1983 | (EP) . |
| 0 102 847 | 3/1984 | (EP) . |
| 0 107 104 | 5/1984 | (EP) . |
| 0 183 324 | 6/1986 | (EP) . |
| 0 207 640 | 1/1987 | (EP) . |
| 0 226 123 | 6/1987 | (EP) . |
| 0224123 | 6/1987 | (EP) . |
| 0226123 | 6/1987 | (EP) . |
| 0299628 | 1/1989 | (EP) . |
| 0 314 417 A3 | 5/1989 | (EP) . |
| 0 318 164 | 5/1989 | (EP) . |
| 0 322 353 | 6/1989 | (EP) . |
| 0322353 | 6/1989 | (EP) . |
| 0 346 996 A2 | 12/1989 | (EP) . |
| 049394A2 | 7/1991 | (EP) . |
| 2 329 427 | 5/1977 | (FR) . |
| 2551223 | 6/1984 | (FR) . |
| 567778 | 3/1945 | (GB) . |
| 630026 | 10/1949 | (GB) . |
| 1 347 762 | 2/1974 | (GB) . |
| 1 378 971 | 1/1975 | (GB) . |
| 2 006 114 | 5/1979 | (GB) . |
| 2082107 | 3/1982 | (GB) . |
| 2155940 | 10/1985 | (GB) . |
| 49-31768 | 3/1974 | (JP) . |
| 52-126474 | 10/1977 | (JP) . |
| 55-132221 | 10/1980 | (JP) . |
| 57-85002 | 5/1982 | (JP) . |
| 58-107501 | 6/1983 | (JP) . |
| 58-167125 | 10/1983 | (JP) . |
| 58-45445 | 10/1983 | (JP) . |
| 59-39526 | 3/1984 | (JP) . |
| 59-86615 | 5/1984 | (JP) . |
| 5986603 | 5/1984 | (JP) . |
| 39-17442 | 8/1984 | (JP) . |
| 59-193915 | 11/1984 | (JP) . |
| 60-245607 | 12/1985 | (JP) . |
| 62-25162 | 6/1987 | (JP) . |
| 62-288030 | 12/1987 | (JP) . |
| 3-184001 | 2/1992 | (JP) . |
| WO 89/11672 | 11/1989 | (WO) . |
| WO 89/11966 | 12/1989 | (WO) . |
| 90/13413 | 11/1990 | (WO) . |
| WO 92/12851 | 8/1992 | (WO) . |

OTHER PUBLICATIONS

Leaflet from PPG Industries—CR–39 Monomer.

Brochure from Goldenwest Mfg. Inc.—Fast Cast—FC "Brings New Ideas to Life in Less Than 15 Minutes".

Article from *Et Ultra* "The Peptide Connection" Winter–Spring 1989.

"Kinetics and Mechanism of the Benzoin Isobutyl Ether Photoinitiated Polymerization of Styrene" Lipscomb et al. *Journal of Polymer Science*: Part A: *Polymer Chemistry*, vol. 26, 529–540 (1988).

Chapter 10. Diallyl Carbonates, pp. 301–325.

A Comparison of Photoinitator Efficiency in the Polymerization of Diethylene Glycol bis (Allyl Carbonate) by Lipscomb et al.

Supplementary Partial European Search Report Dated Oct. 16, 1991; European Patent application 0 346 996 dated Dec. 12, 1989 to Renzi entitled "Process for Preparing Organic Glasses".

Dissertation Submitted to the Faculty of the Graduate School of The University of Louisville in Partial Fulfillment of the Requirements for the Degree of Doctor of Philosophy entitled "UV–Photoinitated Polymerization of Styrene and Diethylene Glycol Bis(Allyl Carbonate) by Aromatic Carbonyl Compunds" by Omar M. Buazza dated Dec. 1987.

Examiner's First Report on Australian Patent Application 46219/89.

Roffey "Photopolymerization of Surface Coatings", John Wiley & Sons 1982, p. 163.

International Search Report on International Application No. PCT/US92/00327.

Patent Abstracts of Japan, vol. M–700, 12171, May 21, 1988.

International Search Report on International Application No. PCT/US92/00327, mailed Nov. 4, 1992.

Patent Abstracts of Japan Patent No. 63227603, published Sep. 21, 1988.

Annex to the International Search Report on International Patent Application No. 92/00327.

Preliminary International Search Report From Eurpoean Branch of PCT ISA.

Abstract No. J03116003.

JP Abstract 58042436 to Matsushita Denki Sangyo (Patent Abstracts of Japan), vol. 7, No. 124 (M218) May 28, 1983.

Computer Patent Search (May 5, 1992—Jun. 30, 1992).

PCT Search Report for PCT/US93/07551 mailed Dec. 22, 1993.

Patent Abstracts of Japan, PN JP3184001, Aug. 12, 1991.

Patent Abstracts of Japan, Application No. 88–310754, Mar. 17, 1987.

Article from Vision Monday dated Oct. 22, 1990 entitled "Vision Sciences Re–Casts Service Image".

Article from Eyecare Business dated Nov. 1990, pp. 28–30, entitled "Liquid Gold or Snake Oil?".

Articles from Vision Monday dated Jan. 7, 1991 p. 20 entitled "25–Minute Lens–Molding System Bows; and 20/20 dated Feb. 1991 p. 18 entitled 25–Minute Lens–Molding System Debuts".

Partial European Search Report for 89912757.5 mailed Oct. 16, 1991.

Annex to the Partial International Search of PCT/US93/07692 mailed Aug. 12, 1993.

Gary W. Ceska, Sartomer Company "Raw Materials—UV–EB Cure; Monomers/Oligomers, Photoinitiators."

"Coburn/LTI Coating system: Clean'n'Coat™Unit," Section 1–1 through Section 5–3.

David Rush, Memorandum regarding Coburn/LTI Clean 'N' Coat System Update, dated Nov. 7, 1990, 10 pages.

UVEXS Incorporated "Operating Manual for Optical Lens Coating and UV Curing System, Model 912," Jan. 1992.

UVEXS Incorporated "Optical Lens Coating and Ultraviolet Curing System, Model 912, Specification UVC 91–181," Dec. 6, 1991, 7 pages.

Sartomer Company, "Monomer/Oligomer Photoinitiator Product Line" manual, 1991, 24 pages.

* cited by examiner

PLASTIC LENS AND PLASTIC LENS MANUFACTURING SYSTEM

CROSS-REFERENCE TO RELATED PATENT APPLICATIONS

This application is a divisional of copending application Ser. No. 07/425,371 filed Oct. 26, 1989, which is a continuation-in-part of patent application Ser. No 07/273,428 filed Nov. 18, 1988, now U.S. Pat. No. 4,879,318, which is a continuation-in-part of patent application Ser. No. 07/021,913 filed Mar. 4, 1987, now abandoned, which is a continuation-in-part of Ser. No. 06/823,339, filed Jan. 28, 1986, now U.S. Pat. No. 4,728,469.

BACKGROUND OF THE INVENTION

This invention relates generally to plastic lens compositions and methods and apparatus for making plastic lenses, and in one of its aspects to corrective or plano plastic lenses for use in eyeglasses and the like.

Optical lenses have been produced from the polymer of diethylene glycol bis(allyl)-carbonate (DEG-BAC) by thermal curing techniques. These techniques For polymerizing DEG-BAC to produce an optical lens, however, have several disadvantages and drawbacks. One of the most significant drawbacks is that it takes approximately 12 hours to produce a lens according to this technique and therefore a lens forming mold can produce at most two lenses per day.

Moreover, the thermal curing process employs a thermal catalyst so that the polymerizable mixture of DEG-BAC and catalyst will slowly polymerize even while refrigerated. The polymerizable mixture therefore has a very short shelf life and must be used within a short time or it will harden in its container.

Furthermore, the thermal catalysts utilized in these procedures are quite volatile and dangerous to work with requiring extreme care in handling.

U.S. Pat. No. 4,166,088 discloses the formation of a plastic lens by disposing a lens forming material comprising a liquid monomer and a photosensitive initiator into a mold cavity defined in part between a pair of spaced apart molds each having a lens forming surface facing the cavity and an outer opposed surface, and then directing rays of ultraviolet light against the outer surface of at least one of the molds to act on the lens forming material in the cavity to produce a lens therefrom.

U.S. Pat. Nos. 3,038,210 and 3,222,432 disclose the heating of a lens forming material in a mold cavity by an external heat source.

U.S. Pat. No. 4,298,005 discloses an apparatus for generating ultraviolet light having a wavelength in the range of 320 to 450 nm for hardening plastics.

The polymer of DEG-BAC exhibits desirable optical and mechanical properties. These properties include high light transmission, high clarity, and high index of refraction together with high abrasion and impact resistance. These properties in the past made DEG-BAC one of the leading monomers in the manufacture of high quality lenses, face shields, sun and safety glasses. Other properties of DEG-BAC, however, such as its slow rate of polymerization make it an undesirable monomer in the manufacture of these items.

SUMMARY OF THE INVENTION

One aspect of the present invention is to provide a method and apparatus for making a plastic lens, such as an optical lens for use in eyeglasses and the like.

Another aspect of the present invention is to reduce the yellowing of the plastic lens during the making thereof.

Yellowing of the plastic lens has been found to be form the lens forming material.

According to one embodiment of the present invention, a lens forming composition comprises diethylene glycol bis (allyl carbonate) (DEG-BAC) and one or more mono or multifunctional acrylate monomers that can be radiation cured to produce a hard, tough, clear, and strain-free polymeric material which has excellent optical qualities. The composition further comprises a suitable photoinitiator that is selected preferably from the group consisting of 2-hydroxy-2-methyl-1-phenyl-propan-1-one and 1-hydroxy- cyclohexyl phenyl ketone. Preferably, the mono or multifunctional acrylate monomers of this composition may be selected from tetrahydrofurfuryl acrylate (TFFA), trLmethylol propane triacrylate (TMPTA) and tetrahydrofurfuryl-methacrylate (TFFMA).

It is a further object of the present invention to provide a plastic lens that can be produced in less than two hours and preferably in less than one hour.

It is a still further object of the present invention to provide a plastic lens that has no distortions, cracks, patterns, striations, defects, or aberrations.

It is a still further object of the present invention to provide a plastic lens that is hard, strong and durable, and has very little flexibility at high temperatures.

It is a still further object of the present invention to provide a plastic lens that easily releases from the molding apparatus.

Toward the fulfillment of the above and other objects, according to another embodiment of the present invention, a lens forming composition comprises aromatic-containing bis(allyl carbonate)-functional monomer and at least one polyethylenic-functional monomer containing two ethylenically unsaturated groups selected from acrylyl and methacrylyl. The composition further comprises a suitable photoinitiator and optionally comprises one or more of a polyethylenic-functional monomer containing three ethylenically unsaturated groups selected from acrylyl and methacrylyl, styrene, a mold release agent and a dye.

According to a further embodiment of the present invention, a lens forming composition comprises at least one polyethylenic-functional monomer containing two ethylenically unsaturated groups selected from acrylyl and methacrylyl. The composition further comprises a suitable photoinitiator and optionally comprises one or more of a polyethylenic-functional monomer containing three ethylenically unsaturated groups selected from acrylyl and a methacrylyl, styrene, a mold release agent and a dyes According to a still further embodiment of the present invention, a lens forming composition comprises a polyethylenic-functional monomer containing three ethylenically unsaturated groups selected from acrylyl and methacrylyl. The composition further comprises a suitable photoinitiator and optionally comprises one or more of an aromatic-containing bis(allyl carbonate)-functional monomer, styrene, a mold release agent and a dye.

BRIEF DESCRIPTION OF THE DRAWINGS

The above brief description as well as further objects, features and advantages of the composition, method and apparatus of the present invention will be more fully appreciated by reference to the following detailed description of presently preferred but nonetheless illustrative embodiments in accordance with the present invention when taken in conjunction with the accompanying drawings in which.

DESCRIPTION OF THE PREFERRED EMBODIMENTS

Figure 1:
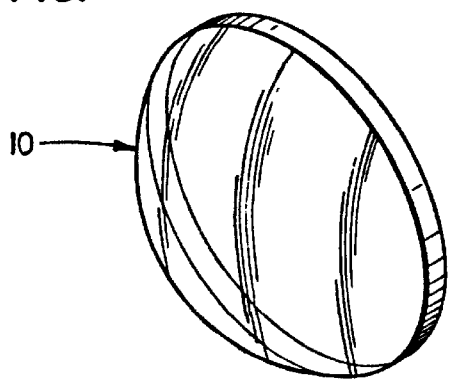
FIG. 1 is a perspective view of a plastic lens of the present invention.

While various aspects of the present invention are hereinafter illustrated and described as being particularly adapted for the production of a plastic lens for use in eyeglasses, it is to be understood that lenses for other uses can also be produced, such as safety glasses and UV-filters as well as lenses having high quality optical use for instrument sightings, photography and light filtration.

Therefore, the present invention is not to be limited to only the embodiments illustrated in the drawings, because the drawings are merely utilized to illustrate one of the wide variety of uses of this invention.

Referring now to FIG. 1, a plastic lens of the present invention is generally indicated by the reference numeral 10. The plastic lens 10 may be formed by an apparatus of the present invention that is generally indicated by the reference numeral 11 in FIGS. 2 and 3 and which will be hereinafter described.

The ultraviolet light cured plastic lens 10 of the present invention can be formed in a substantially shorter time period than lenses formed by thermal curing techniques such as in the manner set forth in U.S. Pat. Nos. 3,038,210 and 3,222,432 the disclosures of which are hereby specifically incorporated herein by reference. Approximately 8 to 14 hours are required to form a thermally cured plastic lens whereas a plastic lens can be formed in less than 2 hours according to one embodiment of the composition, method and apparatus 11 of the present invention.

Figure 2:
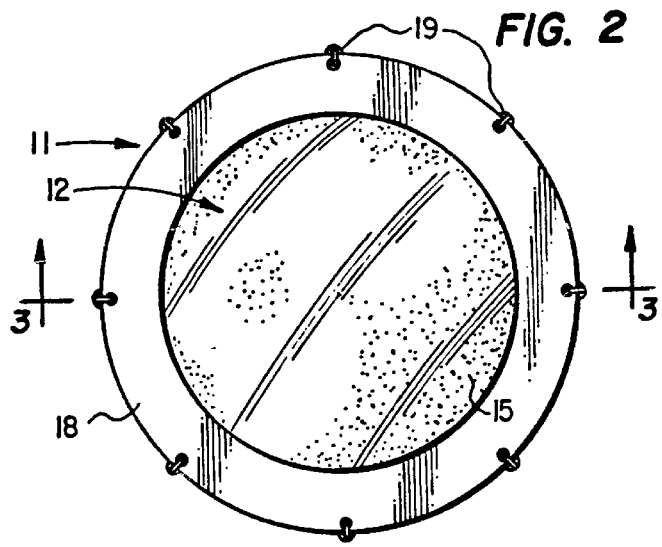
FIG. 2 is a reduced top view of a portion of an apparatus of the present invention that is illustrated in FIG. 3, FIG. 2 being taken substantially on line 2—2 of FIG. 3.
Figure 3:
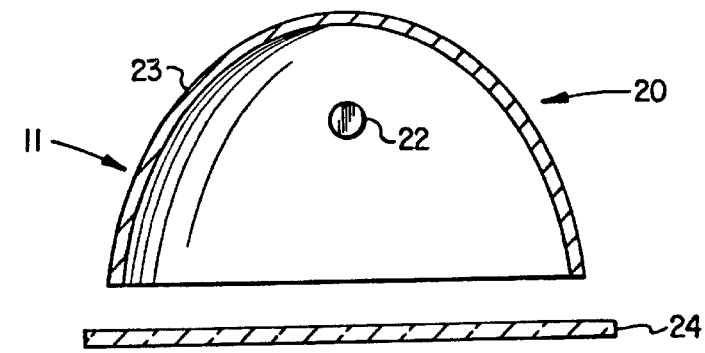
FIG. 3 is an enlarged fragmentary cross-sectional view taken on line 3—3 of FIG. 2 which schematically illustrates an apparatus for producing a plastic lens according to the present invention.
Figure 3:
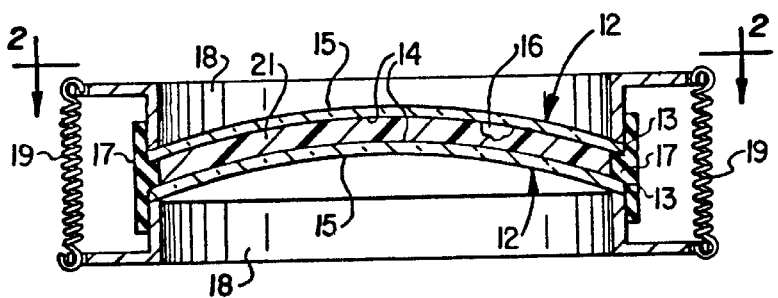
Figure 3:
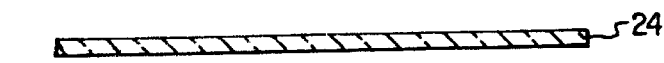
Figure 3:
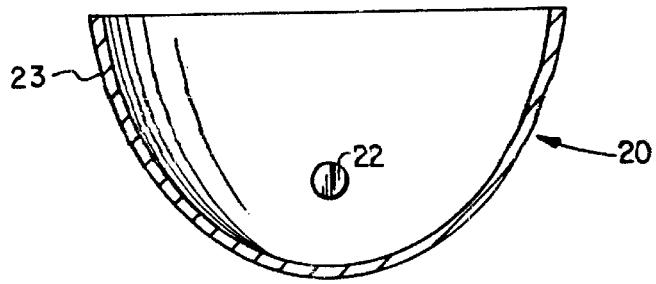

As illustrated in FIGS. 2 and 3, the apparatus 11 of the present invention includes a pair of suitably shaped mold members 12 formed of any suitable material that will permit rays of ultraviolet light to pass therethrough. The mold members 12, preferably, are formed of glass. Each mold member 12 has an outer peripheral surface 13 and a pair of opposed surfaces 14 and 15 with the surfaces 14 being precision around. In a preferred embodiment the surfaces 15 are frosted to aid in the substantially even distribution of ultraviolet light and to prevent the setting up of discontinuous intensity gradients in the ultraviolet light. Preferably the molds have desirable ultraviolet light transmission characteristics and the mold surfaces preferably have no surface scratches or other defects.

The mold members 12 are adapted to be held in spaced apart relation to define a mold cavity 16 between the facing surfaces 14 thereof. The mold members 12 are held in a spaced apart relation by a T-shaped flexible annular gasket 17 that seals the cavity 16 from the exterior of the mold members 12. The mold members 12 are held in assembled relation with the sealing gasket 17 by a pair of annular clamping members 18 that are held together preferably with a suitable spring force, such as a spring force that is provided by the tension springs 19 illustrated in the drawings.

In this manner, in the embodiment of the present invention that is illustrated in FIG. 3 the upper mold member 12 has a concave inner surface 14 while the lower mold member 12 has a convex inner surface 14 so that the resulting mold cavity 16 is shaped to form a lens 10 with a desired configuration. Thus, by selecting the mold members 12 with a desired surface 14, lenses 10 with different characteristics, such as focal lengths, can be made by the apparatus 11. Such techniques are well known to those skilled in the art, and will therefore not be further discussed.

In one embodiment, the apparatus 11 of the present invention includes a device 20 for directing rays of ultraviolet light against the outer surface 15 of the mold members 12. The rays of ultraviolet light pass through the mold members 12 and act on a lens forming material 21 disposed in the mold cavity 16 in a manner discussed below so as to form a lens 10. Each device 20 includes an ultraviolet light producing device 22 disposed outboard of a mold member 12 and the rays (not shown) of ultraviolet light from each device 22 are reflected by a suitably shaped hood type reflector 23. The reflected rays of ultraviolet light pass through a suitable filter 24 to engage against the outer surface 15 of the mold members 12. In one embodiment of the present invention, each device 20 is similar to the radiation apparatus disclosed in U.S. Pat. No. 4,298,005 the disclosure of which is hereby specifically incorporated herein by reference.

In one embodiment of the present invention each light source or device 22 preferably comprises a high pressure mercury lamp with a heavy metal additive, such as iron. This type of lamp produces a significant amount of energy in the 320 nm. range. A standard mercury ultraviolet source can also be used for a longer period to achieve the same results.

The filter 24 for each device 22 preferably comprises a Pyrex glass plate which filters out ultraviolet light having a wavelength below approximately 300 nm. thereby to prevent excessive heat buildup in the mold cavity 16. The lens forming material 21 in the mold cavity 16 is cooled during the curing cycle by passing cooling air over the mold arrangement.

According to this embodiment, it is preferred that the ultraviolet ray generating devices 20 irradiate the lens forming material 21 with ultraviolet light in the range of approximately 300 nm to 400 nm since the effective wavelength spectrum for curing the material 21 lies in the 300 nm to 400 nm region.

While each filter 24 has been illustrated and described as being a one filter member, it will be recognized by those skilled in the art that each filter 24 could comprise a plurality of filter members or comprise any other device effective to filter out ultraviolet light having a wavelength below approximately 300 nm., as desired.

Also according to this embodiment, it is preferred that the glass mold members 12 are formed from a material that will not allow ultraviolet radiation having a wavelength below approximately 300 nm to pass therethrough. One such material is Schott Crown or S-1 glass that is manufactured and sold by Schott Optical Glass Inc., of Duryea, Pa.

According to a preferred embodiment of the present invention, the outer surface 15 of the mold members 12 is frosted. The frosting of the outer surface 15 of the mold members 12 in combination with the ray directing device 20 provides ultraviolet light having no sharp discontinuities throughout the mold cavity 16 thereby leading to a reduction in optical distortions in the lens 10. It is also preferable that there be no sharp gradients of ultraviolet radiation either horizontally or vertically through the material 21 with approximately 50% of the radiation from each device 20 reaching the center of the material 21. To ensure that sufficient radiation is reaching the center of the material 21, it should be possible to measures 1 mW/sqcm of ultraviolet light on the side of the mold cavity opposite the ray directing device 20. Also, any component of the lens forming material 21 that absorbs ultraviolet light in the range of 300 to 400 nm. except the photoinitiator should be eliminated from the lens forming material 21.

In general, photochemical and thermal curing systems are analogous except that light instead of heat is the main driving force for the polymerization reaction. Curing of a lens by ultraviolet light as opposed to thermal curing presents many problems, however, that must be overcome to produce a viable lens. The most troublesome of these problems include yellowing of the lens, cracking of the lens, production of patterns in the lens and premature release of the lens from the mold.

Yellowing of the finished lens has been found to be related to the monomer composition, the intensity of ultraviolet light, the identity of the photoinitiator and the concentration of the photoinitiator. The effect of the photoinitiator is the strongest but each of the others plays a part.

When casting a lens, particularly a positive lens that is thick in the center, cracking is a very serious problem. Addition polymerization reactions, including photochemical addition polymerization reactions, are exothermic. During the process, a large temperature gradient builds up and the resulting stress tends to cause the lens to crack. It is believed that with positive lenses it is more difficult for the heat generated in the polymerization process to migrate to the surface of the lens and be dissipated quickly enough to avoid cracking.

Also, when the lens forming composition includes monomers that tend to be brittle, the lens is more prone to crack. DEG-BAC, without any additives or comonomers produces a very hard but somewhat brittle polymer that is very prone to cracking. In addition, DEG-BAC, without additives tends to stick very tightly to the molds. When a portion of a lens adheres tightly to the mold, cracking often occurs.

When the polymerization reaction proceeds too rapidly, heat buildup inside the system which leads to cracking is inevitable. The likelihood of cracking increases as the temperature difference between the center of the lens forming material and room temperature increases. During the polymerization process, several forces tending to crack the lens, such as shrinkage, adhesion, and thermal gradients, are at work. Other forces tending to crack the lens occur when the irradiation is stopped and the lens is cooled, especially if the reaction cell is allowed to cool too quickly.

Distortions in the finished lens are very troublesome. If the incident ultraviolet light has sharp discontinuities, visible distortion patterns may appear in the finished lens. Although the incident ultraviolet light was made as uniform as possible, it was found difficult to produce an acceptable product from DEG-BAC alone. It was determined that it is preferable to include additives in the lens forming composition to reduce the distortions.

It was found that by mixing DEG-BAC with additives or comonomers, its cracking tendency was decreased. By varying the raw material composition of DEG-BAC with additives or comonomers, it was possible to produce a wide variety of materials ranging from hard and tough to rubber-like materials. The rate of polymerization of the composition including DEG-BAC was increased by incorporating one or more compounds containing an acrylate group such as tetraethylene glycol diacrylate (TTEGDA), tripropylene glycol diacrylate (TRPGDA), trimethylolpropane triacrylate (TMPTA), tetrahydrofurfuryl methacrylate (TFFMA) and tetrahydrofurfuryl acrylate (TFFA). Those skilled in the art will recognize that other compounds that tend to increase the rate of polymerization of a composition including DEG-BAC can also be included.

TTEGDA tends to increase the overall rate of polymerization and tends to reduce the amount of yellowing in the finished lens. TTEGDA, however, also tends to increase the cracking of the lens. TRPGDA also increases the rate of polymerization. TMPTA and TFFMA tend to prevent the development of patterns and fringes in the finished lenses. TFFA tends to reduce cracking and the development of patterns in the finished lenses. TFFA also tends to reduce the degree to which the lenses stick to the mold. Preferably, 12–25% by weight of TFFA is incorporated in the composition to yield the desirable effects noted above. Preferably, no more than 25% by weight TFFA is included since a proportion greater than 25% tends to decrease the hardness of the finished lens.

An obstacle to the production of lenses having no defects or aberrations is the formation of convective striations, or optical inhomogeneity. These defects are commonly referred to as "patterns" or "wavy patterns".

The formation of these defects usually occurs during the early stages of the polymerization reaction during the transformation of the lens forming composition from the liquid to the gel state. Once patterns form they are almost impossible to eliminate. When gelation occurs there is a rapid temperature rise. In positive lenses, the temperature rise can reach 85° C. which often leads to the lens fracture. The exothermic polymerization step causes a temperature increase, which in turn causes an increase in the rate of polymerization, which causes a further increase in temperature. If the heat exchange with the surroundings is not sufficient enough there will be a runaway situation that leads to the appearance of thermally caused striations and even breakage. Since the rate of polymerization increases rapidly at the gelation point, this is a critical phase of the reaction.

The best quality lenses according to the present invention were found to result from a smooth reaction process that is not too fast and not too slow. Heat must not be generated by the process so fast that it cannot be exchanged with the surroundings. The incident ultraviolet light intensity must be adjusted because too much incident light can also cause the reaction to proceed too rapidly. Also, the seal between the gasket and the mold must be as complete as possible.

Conditions that lead to the production of lenses that are free from patterns are when (1) a good seal between the gasket and the mold is achieved; (2) the mold surfaces are free from defects; (3) a formulation is used having an appropriate concentration of initiator that will produce a reasonable rate of temperature rise; (4) the formulation is homogeneous; and (5) shrinkage is minimized. The process of the present invention is conducted in a manner that maximizes these conditions.

Premature release of the lens from the mold will result in an incompletely cured lens and the production of lens defects. Factors that contribute to premature release are (1) a poorly assembled mold; (2) the presence of air bubbles around the sample edges; (3) the covering of a part of the sample from light; (4) imperfection in gasket lip or mold edge; (5) inappropriate formulation; and (6) high shrinkage. The process of the present invention is conducted in a manner that minimizes these conditions.

The gasket has been found to have a significant effect during the curing process. Specifically, premature release can occur when the molds are held too rigidly by the gasket. There must be enough flexibility in the gasket to permit the molds to follow the lens as it shrinks. In this regard, reference is made to U.S. Pat. Nos. 3,038,210 and 3,222,432, the disclosures of which are specifically incorporated herein by reference. Indeed, the lens must be allowed to shrink in diameter slightly as well as in thickness. Breakage of the lens occurs in some cases because there is adhesion between the lens and the gasket. The use of a gasket that has a reduced degree of stickiness with the lens during and after curing is therefore desirable.

In a preferred technique for filling the lens forming cavity, the gasket is placed on the concave mold and the lens forming composition is poured into place. The convex mold is moved into place and a small amount of the lens forming composition is forced out around the edge. The excess is then removed, preferably, by vacuum. The small amount of liquid which escapes outside the lens body and collects between the top innerside of the gasket and the top mold edge also presents a problem. During the curing process this liquid will transform to a solid state and will affect the performance of the gasket as well as the mold. Thus, the alignment of the top mold is very important. Gasket deterioration usually occurs at the top side because of the inherent spill factor. To avoid the alignment and spill problems, the molds, preferably, are clammed in place using a desired amount of pressure and then the lens forming composition is injected.

Despite the above problems, the advantages offered by the radiation cured lens molding system clearly outweigh the disadvantages. The advantages of a radiation cured system include a significant reduction in energy requirements, curing time and other problems normally associated with conventional thermal systems.

According to the present invention, the lens forming material can comprise any suitable liquid monomer or monomer mixture and any suitable photosensitive initiator. In this embodiment, the liquid lens forming material, preferably, is filtered for quality control and is placed in the mold cavity 16 by pulling the gasket 17 away from one of the mold members 12 and injecting the liquid lens forming material 21 into the cavity 16. Once the cavity 16 is filled with such material 21, the gasket 17 is replaced into its sealing relation with the mold members 12. The material 21 can then be irradiated with ultraviolet light in the manner described above for a time period that is necessary to cure the lens forming material 21. The ultraviolet light entering the mold cavity 16 preferably has a wavelength in the range of approximately 300 nm. to approximately 400 nm. The surface 15 of the mold members 12 preferably is frosted. The frosted surfaces 15 in combination with the reflectors 23 act to prevent the development of discontinuous gradients in the ultraviolet light as it passes through the lens forming material 21 in the mold cavity 16 during such time period.

The lens forming material 21, preferably, can be cured in the above manner by directing rays of ultraviolet light from one device 20 through the mold member 12 rather than utilizing both devices 20 as previously described.

Those skilled in the art will recognize that once the cured lens 10 is removed from the mold cavity 16 by disassembling the mold members 12, the lens 10 can be further processed in a conventional manner, such as by grinding its peripheral edge.

As previously stated one aspect of the first embodiment of the present invention is the prevention of yellowing of the lens forming material 21 during the curing thereof. One means of realizing this aspect is to provide a lens forming material that leads to reduced yellowing.

One component of the lens forming material that leads to reduced yellowing is the photoinitiator. Photoinitiators are the photochemical counterparts of catalysts such as the difficult to handle peroxides that are used mainly in thermal free radical polymerizations. Thermal catalysts are usually very unstable and often dangerous to handle, while the ultraviolet photoinitiators, utilized according to the present invention are easily handled and quite safe.

In general, a photoinitiator having utility in the present invention will exhibit an ultraviolet absorption spectrum over the 300–400 nm range. High absorptivity of a photoinitiator in this range, however, is not desirable, especially when casting a thick positive lens. The following are examples of the illustrative photoinitiator compounds within the scope of the invention: 2-hydroxy-2-methyl-1-phenylpropan-1-one, 1-hydroxycyclohexyl phenyl ketone, 2,2-di-sec-butoxyacetophenone, 2,2-diethoxyacetophenone, 2,2-diethoxy-2-phenyl-acetophenone, 2,2-dimethoxy-2-phenyl-acetophenone, benzo a methyl ether, benzoin isobutyl ether, benzoin, benzil, benzyl disulfide, 2,4-dihydroxybenzophenone, benzylideneacetophenone, and acetophenone.

In addition, the polymerization must take place very uniformly. The incident ultraviolet light must be made to have no discontinuous gradients to maximize the uniformity of the polymerization. If ore portion of the lens polymerizes faster than another, visible distortions may be produced that remain in the cured lens. A strongly absorbing photoinitiator will absorb most of the incident light in the first millimeter of lens thickness, causing rapid polymerization in that region. The remaining light will produce a much lower rate of polymerization below this depth and will result in a lens that has visible distortions. An idea photoinitiator will exhibit that activity, but will have a lower extinction coefficient in the useful range. A lower extinction coefficient of photoinitiators at longer wavelengths allows the ultraviolet radiation to penetrate deeper into the reaction system. This deeper penetration of the ultraviolet radiation allows photoinitiator radicals to form uniformly throughout the sample and provide excellent overall cure. Since the sample can be irradiated from both top and bottom, a system in which appreciable light reaches the center of the lens is essential. The photoinitiator solubility and compatibility with the monomer system is also an essential requirement.

An additional consideration is the effect of the photoinitiator fragments in the finished polymer. Some photoinitiators generate fragments that impart a yellow color to the finished lens. Although such lenses actually absorb very little visible light, they are cosmetically undesirable.

Photoinitiators are often very system specific so that photoinitiators that are very efficient in one system may be much poorer in another. The preferred photoinitiators for the system according to the first embodiment of the present invention are 2-hydroxy-2-methyl-1-phenyl-propan-1-one and 1-hydroxycyclohexyl phenyl ketone. The identity of the initiator and its concentration are very important for any particular formulation. A concentration of initiator that is too high leads to cracking and yellowing of the lens. Concentrations of initiator that are too low lead to incomplete polymerization and a soft material.

In particular, according to the first embodiment of the present invention, the liquid monomer comprises diethylene glycol bis(allyl)-carbonate and the initiator utilized therewith comprises 2-hydroxy-2-methyl-1-phenyl-propan-1-one with such initiator comprising approximately 1% to 3% by weight of the lens forming material. The balance of the composition is provided by the monomer alone or preferably with additives as discussed below. The above-noted initiator is commercially available from EM Chemicals under the tradename Darocur 1173.

Also, according to the first embodiment of the present invention, the liquid monomer comprises diethylene glycol bis(allyl)-carbonate and the initiator utilized therewith comprises 1-hydroxycyclohexyl phenyl ketone with such initiator comprising approximately 2% to 6% by weight of the lens forming material. The balance of the composition being provided by the monomer alone or preferably with additives as discussed below. The above-noted initiator is commercially available from Ciba-Geigy under the tradename Irgacure 184.

In the system according to the first embodiment of the present invention, each of the above two initiators reduce yellowing of the lens forming material during the curing operation because a large amount of the same is not required in combination with the above described monomer.

For example, according to the first embodiment of the present invention, when diethylene glycol bis(allyl)-carbonate is used with the photoinitiator Darocur 1173, the preferred amount of Darocur 1173 is approximately 2.5% by weight of the lens forming material. When diethylene glycol bis(allyl)-carbonate is used with the photoinitiator Irgacure 184, the preferred amount of Irgacure 184 is approximately 3.3% by weight of the lens forming material.

Also according to the first embodiment of the present invention, each of the last two above described combinations of the liquid monomer and the photosensitive initiator preferably include one or more additives to improve the plastic lens being made therefrom.

In particular, one such additive is 2-ethyl-2-(hydroxymethyl)-1,3-propanediol triacrylate with such additive comprising approximately 2% to 4% by weight of the lens forming material and being commercially available from Aldrich or Interez. In this system, this additive reduces the amount of optical distortion in the plastic lens.

Another additive that can be used by itself or in combination with the previously described additive is 1,6-hexanediol diacrylate (HDDA) with such additive comprising approximately 2% to 7% by weight of the lens forming material and being commercially available from Rohm Tech.

Other additives such as TFFA (available from Sartomer), TFFMA (available from Sartomer) and TMPTA (available from Aldrich or Interez) may be included to suppress the development of patterns and fringes in the lens and reduce the degree to which the lenses stick to the mold, respectively, as discussed above.

The first embodiment of the invention will now be described in more detail with reference to the following examples. These examples are merely illustrative of the composition and method of the invention and are not intended to be limiting.

EXAMPLE 1

The photo-initiating efficiency of various commercially available initiator compounds in the polymerization of diethylene glycol bis(allyl)carbonate (DEG-BAC) was investigated at a constant light intensity of 17 mW/cm$^2$, and initiator concentration of 3%(w/v). The rate of polymerization was monitored by IR-spectroscopy using the absorption band of the stretching vibration of the olefinic double bond at 1650 cm$^{-1}$. The results showed that 2-hydroxy-2-methyl-1-phenylpropan-1-one and 1-hydroxycyclohexyl phenyl ketone have the highest efficiency as initiators for the polymerization of DEG-BAC. In contrast, benzoin and benzoin ethers produced much lower rates of polymerization and are therefore poor initiators for DEG-BAC.

Apparatus

A Hanovia medium pressure mercury lamp, containing a small amount of iron iodide to improve the spectral output in the UV-region around 350 nm, was used as a UV-light source. The lamp was housed in an air cooled housing equipped with an elliptical reflector. The lamp was operated with a special stabilizer ballast to supply constant power at three different intensities of 125, 200, and 300 Watts/inch. A ¼ inch filter of Pyrex glass was placed in the path of the beam to absorb short wavelength UV-light. The total incident light intensity was measured by a digital radiometer equipped wits a 1 cm$^2$ diffuse-sensor window. This radiometer operates in the spectral range of 320 to 380 nm with a full range reading from zero to 200 mW/cm$^2$.

All IR-spectroscopy was performed on a Nicolet 7199 Fourier Transform spectrophotometer equipped with a triglycine sulfate detector.

UV-spectra of the initiator/monomer solutions were recorded on a Shimadzu UV-160, a microcomputer controlled double beam UV-Vis spectrophotometer.

Methods

A solution of 3% initiator in monomer was made up on a weight/volume basis. After the initiator was dissolved in the monomer, the solution was transferred into a test tube and flushed with nitrogen for 15 minutes to sweep out dissolved oxygen. A few drops of the solution were sandwiched between two sodium chloride disks which were separated by a 0.05 mm stainless steel spacer, and then secured in a demountable cell mount. After the cell was assembled, an IR-spectrum was taken. The sample cell was then irradiated for the desired time, removed, and immediately analyzed on the IR-spectrophotometer. This exposure-IR-spectrum cycle was repeated seven or eight times for each sample. Duplicate experiments with different initiators were carried out following the same procedure. The peak area of the IR-bands was calculated using the SETUP computer program which was run from a DEXTER/2 system.

Results

Figure 4:
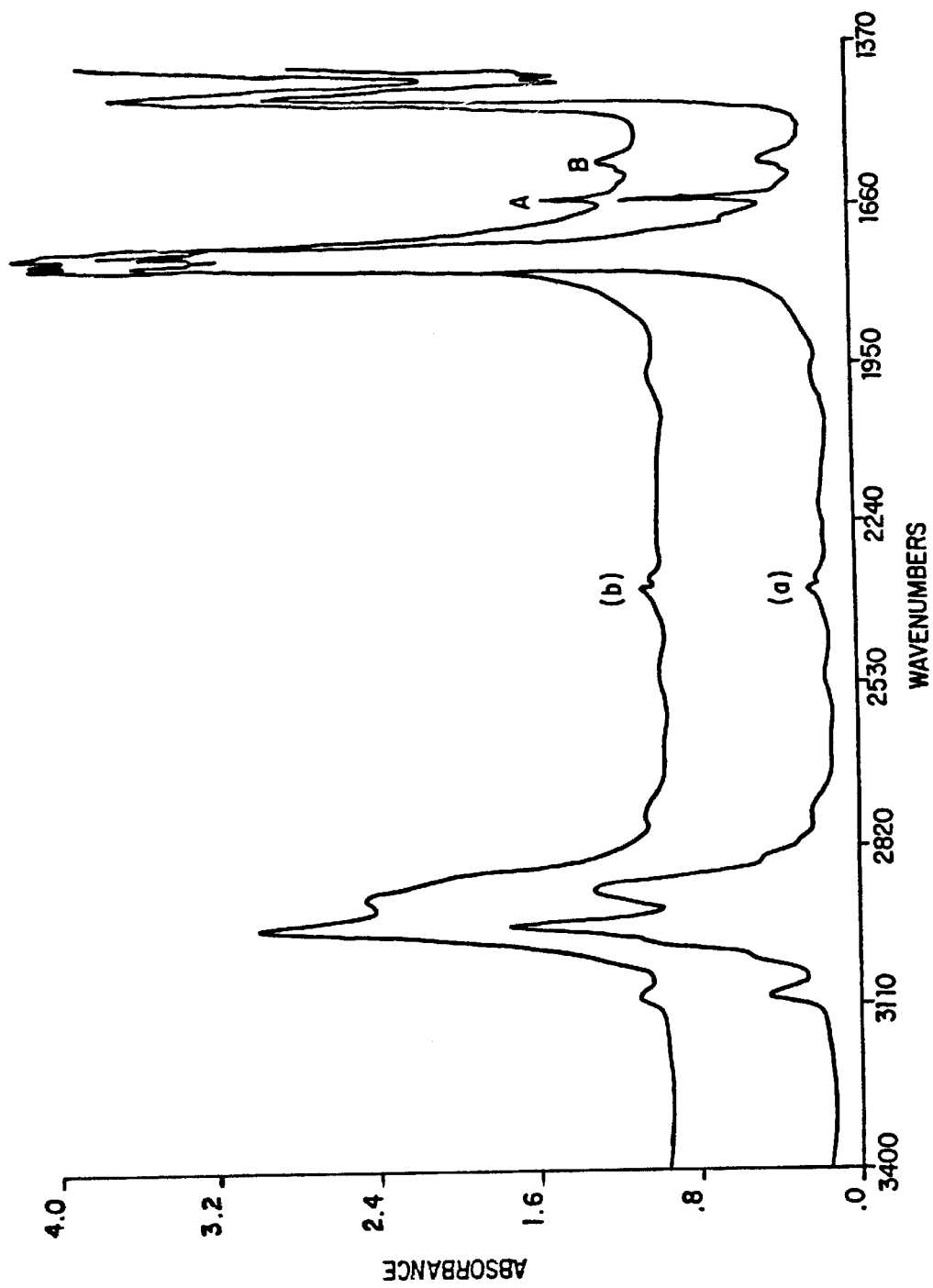
FIG. 4 is an infrared-absorption spectra of DEG-BAC before and after irradiation in the presence of 2-hydroxy-2-methyl-1-phenylpropan-1-one.
Figure 5:
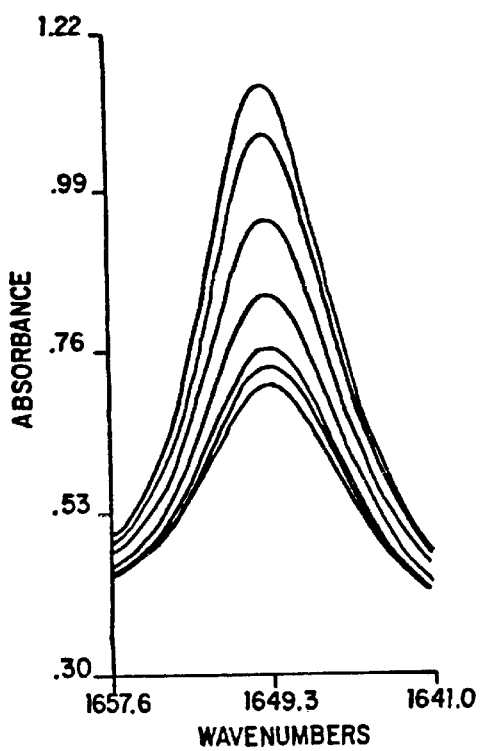
FIG. 5 is a portion of an infrared-absorption spectra of DEG-BAC before, during and after irradiation in the presence of 2-hydroxy-2-methyl-1-phenylpropan-1-one.

FIG. 4 shows an IR-absorption spectra of DEG-BAC before and after irradiation in the presence of 2-hydroxy-2-methyl-1-phenylpropan-1-one, which is commercially available from EM Chemicals under the trademark Darocur 1173. The point of interest is the large decrease of absorption at 1650 cm$^{-1}$ (band A), which is the C=C stretching vibration in the allyl portions of the DEG-BAC. As shown in FIG. 5 this absorption band is an excellent index of the extent of polymerization of DEG-BAC. Other changes in the IR absorption spectra occur, but as the absorption band at 1650 cm$^{-1}$ is due to a fundamental vibration mode, it is the most reliable criteria of the unsaturation content.

The percent residual unsaturation of DEG-BAC was calculated using the following equation:

$$\% \text{ residual unsaturation} = (A_t/A_o) \cdot 100 \quad (1)$$

where $A_o$ and $A_t$ are the absorption peak areas of the band A (base line 1659–1641 cm$^{-1}$), initially and after an irradiation of t seconds, respectively.

Although the demountable cell was used with a fixed spacer, the apparent thickness of the sample was observed to change due to the increase in density as the polymerization proceeds. A band at 1581 cm$^{-1}$ (band B), which did not change appreciably during polymerization, was used as an internal standard. To obtain the correct % unsaturation a correction factor of $B_o/B_t$ was applied to equation 1.

$$\% \text{ residual unsaturation} = \quad (2)$$

$$\% \text{ residual unsaturation} = \frac{(A_t/B_o) \cdot 100}{(A_o/B_t)} \quad (2)$$

where $B_o$ and $B_t$ are the absorption peak areas of band B (base line 1592–1572), initially and at time t during the polymerization, respectively. A representative sample of data is given in Table I below.

TABLE I

Data for the Polymerization of DEG-BAC with 3% 2-Hydroxy-2-methyl-1-phenylpropan-1-one and light intensity of 17 mW/cm$^2$

| Exposure (second) | Absorption area of band A | Absorption area of band B | Unsaturation (%) |
|---|---|---|---|
| 0 | 5.1259 | 1.5541 | 100.00 |
| 60 | 4.6551 | 1.5535 | 90.85 |
| 90 | 4.3616 | 1.5414 | 85.79 |
| 120 | 4.0011 | 1.5118 | 80.24 |
| 180 | 3.5442 | 1.4889 | 72.17 |
| 300 | 2.8985 | 1.4730 | 59.66 |
| 480 | 2.3365 | 1.4513 | 48.81 |

As a further check on the validity of this technique or equation 2, two additional analytical methods were used; refractive index and iodometry. The refractive index method was based on data published by Starkweather and Eirich, *Ind. Eng. Chem.*, 47: 2452 (1955) from which the conversion factor was deduced, The iodine value method was that described in ASTM D1541-60. The results are shown in Table II below.

TABLE II

Percent Residual Unsaturation of the Irradiated DEG-BAC by Three Different Methods.

| Method: | IR | Refractive Index | Iodometry |
|---|---|---|---|
| | 92.5 | 92.2 | — |
| | 91.3 | 93.0 | — |
| | 89.5 | 89.5 | — |
| | 88.8 | 89.5 | — |
| | 83.3 | — | 87.0 |
| | 73.3 | — | 76.1 |
| | 57.1 | — | 60.4 |
| | 29.0 | — | 30.0 |

Comparison of these two methods with the IR method using equation 2 shows reasonable agreement.

The initial rates of polymerization after sequential UV-irradiation were taken from the slopes of the initial part of the % unsaturation-time curves. Table III summarizes the results obtained for the polymerization of DEG-BAC with various initiators at room temperature.

TABLE III

Initial Rates ($R_p$) of Photopolymerization of DEG-BAC with 3% Initiator and Light Intensity of 17 mW/cm$^2$ in the 320–380 nm Region.

| Initiator | λmax | (logξ) | $R_p \times 10^4$M/sec |
|---|---|---|---|
| 2-Hydroxy-2-methyl-1-phenylpropan-1-one | 313 | (1.87) | 68.8 |
| 1-Hydroxycyclohexyl phenyl ketone | 328 | (1.94) | 60.9 |
| 2,2-Di-sec-butoxyacetophenone | 335 | (1.94) | 47.9 |
| 2,2-Diethoxyacetophenone | 334 | (1.87) | 40.7 |
| 2,2-Diethoxy-2-phenyl-acetophenone | 343 | (2.38) | 39.5 |
| 2,2-Dimethoxy-2-phenyl-acetophenone | 318 | (2.34) | 37.3 |
| Benzoin methyl ether | 339 | (2.34) | 18.5 |
| Benzoin isobutyl ether | 340 | (2.31) | 11.3 |
| Benzoin | 312 | (2.58) | 9.65 |
| Benzil | 382 | (1.86) | 5.96 |
| Benzyl disulfide | 242 | (3.54) | 4.05 |
| 2,4-Dihydroxybenzophenone | 324 | (3.99) | 4.00 |
| Benzylideneacetophenone | 308 | (4.08) | 3.73 |
| Acetophenone | 315 | (1.72) | 0.81 |

Conditions for all runs were 3% initiator(w/v) and 17 mW/cm$^2$ effective intensity in the 320–380 nm region. The results show that 2-hydroxy-2-methyl-1-phenylpropan-1-one, which is commercially available from EM Chemicals under the trademark Darocur 1173 and 1-hydroxycyclohexyl-phenyl ketone, which is commercially available from Ciba-Geigy under the trademark Irgacure 184 are the best photoinitiators for DEG-BAC in the group studied. Benzoin ethers, however, which showed high efficiency as initiators for vinyl polymerization, are much less effective in the photopolymerization of DEG-BAC.

EXAMPLE 2

The objective of this example was to develop a composition including DEG-BAC and a procedure for the production of molded eyeglass lenses by ultraviolet photoinitiation.

Composition

It was found to be difficult to prepare an acceptable product by using DEG-BAC and photoinitiator alone in conjunction with the present radiation system. It was determined that the addition of other monomers was essential to obtain the most desirable combination of optical and mechanical properties in the finished lens. The additional monomers were selected from monofunctional and multi-functional acrylates or methacrylates.

The final composition of the raw material was miscible, clear, and dust free. In addition, the ultraviolet transmission of the components except for the photoinitiator were at a maximum in the desired range.

The preferred composition is shown in Table IV.

TABLE IV

| Materials | Supplier | Weight (%) range |
|---|---|---|
| 2-hydroxy-2-methyl-1-phenyl-propan-1-one (Darocur 1173) | EM Chemicals | 0.7–1.3 |
| 1-hydroxy cyclohexyl-phenyl ketone (Irgacure 184) | Ciba-Geigy | 1.2–1.8 |
| Trimethylol propane-triacrylate (TMPTA) | Aldrich, Interez | 2.5–3.0 |
| Tetrahydrofurfuryl-methacrylate (TFFMA) | Sartomer (Arco) | 3.0–2.5 |
| Tetrahydrofurfuryl-acrylate (TFFA) | Sartomer | 12.0–25 |
| Diethylene glycol bis(allyl)-carbonate (DEG-BAC) | PPG Inc. | 80.3–72.3 |

Reaction Cell

The reaction cell included two glass windows shaped to produce the lens and a flexible silicon or vinyl gasket. The glass molds reproduced the lens surfaces. The inside curvature of the molds together with the gasket thickness controlled the lens shape and power. To produce good quality lenses it was important that the glass molds had no surface scratches or other defects.

Ultraviolet light radiation system

The spectral range of interest for ultraviolet radiation curing is 320–400 nm where the most efficient photoinitiators absorb and molds of crown glass allow maximum transmission.

Of the high intensity sources of that available, iron added-mercury arc lamps offer a high output within this preferred range and thus were used in this system. Shorter wavelengths below 320 nm. were blocked by a ¼ inch Pyrex glass filter placed at 6–8 inches from the lamp and 5–7 inches from the reaction cell. This blockage of the short wavelengths was found to be absolutely essential. If the full intensity of the ultraviolet light source was allowed to strike the glass mold it broke due to the strong absorption of the shorter wavelengths by the glass. Even small amounts of radiation at this wavelength caused heating problems that were too severe to overcome.

Additional advantages offered by the Pyrex glass filter included a significant reduction in unwanted IR heat problems normally produced by the lamp. Heat was continuously removed, without disturbing the lamp stability, by blowing air past the filter and the reaction cell. The ultraviolet rays emanating from the lamp were passed through two or three sheets of closely spaced tracing paper at 3 inches from the reaction cell or 2–4 inches from the Pyrex glass filter. The tracing paper increases the uniformity of light distribution with a further reduction in the heating problems.

The light intensity in the 320–400 nm. range, under the above conditions, was reduced from 27 mW/sqcm. (in the absence of the Pyrex glass filter and the tracing paper) to about 6–10 mW/sqcm. with an excellent performance compared with an unmodified radiation system even at comparable light intensity.

Alternatively, it was determined that the high-pressure mercury arc lamps could be replaced by fluorescent tubes without a loss in performance. Sylvania and Philips both produce acceptable fluorescent tubes that generate almost all of their output in the desirable range (320 to 390 nm.). A bank of these lamps was capable of producing at least 8 mW/sqcm. and were effective in this system. These fluorescent tubes provide many advantages over the high-pressure mercury arc lamps as they are inexpensive, compact, and require much less power.

Two illumination sources were used to provide ultraviolet light exposure simultaneously to both sides of the reaction cell. The critical point in the irradiation was found to occur shortly after the gelation point when the rate of polymerization increased drastically and the mobility of the reacting monomer units decreased which resulted in a rapid increase in temperature, especially in thicker samples. At this point cracking of the sample occured if the temperature difference became too great. This critical stage was controlled by monitoring the temperature at the mold surface and keeping the difference in temperature between the mold surface and the surroundings to less than 20° C. At room temperature this meant keeping the temperature at the mold surface below 50° C (120F). An alternative was to reduce the intensity of the ultraviolet light radiation, but this resulted in a longer irradiation time. Another possibility was to reduce the concentration of photoinitiator, which also increased the irradiation time and caused other problems.

The reaction cell was placed where at least 20% of the incident light passed through the cell, to ensure that regions farthest from the lamps received adequate radiation. Using a value of 6 mW/sqcm of incident light it was required that there be 1.2 mW/sqcm passing through the cell.

Two lamps were used to provide sufficient radiation energy throughout the lens forming material so that any deficiency in energy on one side was compensated for by the lamp or the other side. It was found to be very difficult to obtain uniform irradiation with only one lamp.

The monomer mixture contained co-monomers that improved the most needed properties. TMPTA was useful in reducing the effect of unequal radiation over the body of the lens. Without TMPTA, visible distortions occured. TFFA was added to add flexibility to the mixture to prevent cracking of the lens. Between 12 and 25% by weight of TFFA was effective. Above 25% caused too much flexibility and less than 12% failed to prevent cracking. An added bonus was that the addition of TFFA also improved the mold release. A drawback was that TFFA slightly increased the yellowing of the lens.

Procedure

The procedure for producing lenses was as follows:

1. The necessary amount of initiator was dissolved in TFFA using adequate agitation.

2. The necessary amount of DEG-BAC and other ingredients was poured into the photoinitiator-TFFA solution (with adequate agitation) to obtain a clear fluid free of undissolved particles. In some cases, it was helpful to warm the mixture to about 10° C. above room temperature to ensure that the mixture attained a good homogeneous state.

3. Enough lens solution was placed in the cell container which was composed of the concave part of the cell window supported by the desired flexible gasket. The other window was carefully arranged to allow air to escape freely using a micro spatula inserted between the glass mold and the gasket. Once the cell was filled, the spatula was removed and the gasket returned to a sealing condition.

4. The windows were checked and any spillage was removed by vacuum suction.

5. The reaction cell was placed in position between the two radiation sources and the reaction was begun using bath sources. The surface temperature was not allowed to exceed 50° C. in the first 5–10 minutes.

6. At the completion of the curing process (20–60 min. depending on thickness of lens, curvature of lens, the reaction temperature and program of radiation) the reaction cell was allowed to cool to room temperature.

7. The gasket was removed and the windows were carefully removed using a razor or knife inserted between the cured lens and the glass window with a gentle mechanical shock.

It was found according to the above-described first embodiment of the present invention that the DEG-BAC monomeric material has characteristics that make its use in ultraviolet light cured plastic lenses undesirable. Specifically, DEG-BAC is very slow to polymerize and therefore requires a high proportion of initiator which leads to increased yellowing. It was also difficult to produce acceptable positive correction ultraviolet light cured plastic lenses from DEG-BAC due to its slow reaction rate and the required thickness of the lens.

According to another embodiment of the present invention a polymerizable lens forming composition comprises an aromatic-containing bis (allyl carbonate)-functional monomer and at least one polyethylenic-functional monomer containing two ethylenically unsaturated groups selected from acrylyl and methacrylyl. In preferred embodiments, the composition may include one or more of a polyethylenic-functional monomer containing three ethylenically unsaturated groups selected from acrylyl and methacrylyl, styrene, a mold release agent and a dye.

According to a further embodiment of the present invention, a lens forming composition comprises at least one polyethylenic-functional monomer containing two ethylenically unsaturated groups selected from acrylyl and methacrylyl. The composition further comprises a suitable photoinitiator and optionally comprises one or more of a polyethylenic-functional monomer containing three ethylenically unsaturated groups selected from acrylyl and methacrylyl, styrene, a mold release agent and a dye.

According to a still further embodiment of the present invention, a lens forming composition comprises a polyethylenic-functional monomer containing three ethylenically unsaturated groups selected from acrylyl and methacrylyl. The composition further comprises a suitable photoinitiator and optionally comprises one or more of an aromatic containing bis(allyl carbonate)-functional monomer, styrene, a mold release agent and a dye.

Aromatic-containing bis(allyl carbonate)-functional monomers which can be utilized in the practice of the present invention are bis(allyl carbonates) of dihydroxy aromatic-containing material. The dihydroxy aromatic-containing material from which the monomer is derived may be one or more dihydroxy aromatic-containing compounds. Preferably the hydroxyl groups are attached directly to nuclear aromatic carbon atoms of the dihydroxy aromatic-containing compounds. The monomers are themselves known and can be prepared by procedures well known in the art. See, for example, U.S. Pat. Nos. 2,370,567; 2,455,652; 2,455,653; and 2,587,437, the disclosures of which are incorporated herein by reference.

The aromatic-containing bis(allyl carbonate)-functional monomers can be represented by the formula:

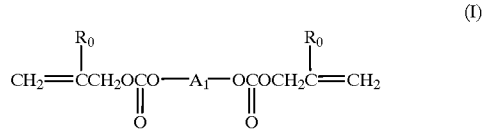

(I)

in which $A_1$ is the divalent radical derived from the dihydroxy aromatic-containing material and each $R_0$ is independently hydrogen, halo, or a $C_1$–$C_4$ alkyl group. The alkyl group is usually methyl or ethyl. Examples of $R_0$ include hydrogen, chloro, bromo, fluoro, methyl, ethyl, n-propyl, isopropyl and n-butyl. Most commonly $R_0$ is hydrogen or methyl; hydrogen is preferred. A subclass of the divalent radical $A_1$ which is of particular usefulness is represented by the formula

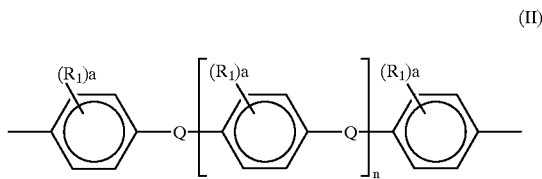

(II)

in which each $R_1$ is independently alkyl containing from 1 to about 4 carbon atoms, phenyl, or halo; the average value of each a is independently in the range of from 0 to 4; each Q is independently oxy, sulfonyl, alkanediyl having from 2 to about 4 carbon atoms, or alkylidene having from 1 to about 4 carbon atoms; and the average value of n is the range of from 0 to about 3. Preferably Q is methylethylidene, viz., isopropylidene.

Preferably the value of n is zero, in which case $A_1$ is represented by the formula

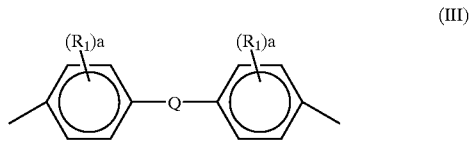

(III)

in which each $R_1$, each a, and Q are as discussed in respect of Formula II. Preferably the two free bonds are both in the ortho or para positions. The para positions are especially preferred.

The dihydroxy aromatic-containing compounds from which A is derived may also be polyol-functional chain extended compounds. Examples of such compounds include alkylene oxide extended bisphenols. Typically the alkylene oxide employed is ethylene oxide, propylene oxide, or mixtures thereof. By way of exemplification, when para, para-bisphenols are chain extended with ethylene oxide, the bivalent radical $A_1$ may often be represented by the formula

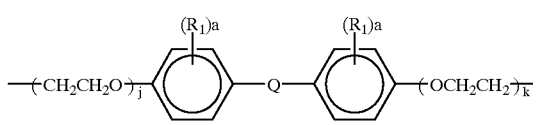

(IV)

where each $R_1$, each a, and Q are as discussed in respect Formula II, and the average values of j and k are each independently in the range of from about 1 to about 4.

The preferred aromatic-containing bis(allyl carbonate)-functional monomer is represented by the formula

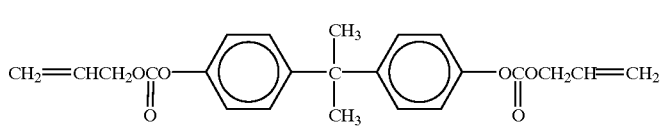

(V)

and is commonly known as bisphenol A bis(allyl carbonate).

A wide variety of compounds may be used as the polyethylenic functional monomer containing two or three ethylenically unsaturated groups. The preferred polyethylenic functional compounds containing two or three ethylenically unsaturated groups may be generally described as the acrylic acid esters and the methacrylic acid esters of aliphatic polyhydric alcohols, such as, for example, the di- and triacrylates and the di- and trimethacrylates of ethylene glycol, triethylene glycol, tetraethylene glycol, tetramethylene glycol, glycidyl, diethyleneglycol, butyleneglycol, propyleneglycol, pentanediol, hexanediol, trimethylolpropane, and tripropyleneglycol. Examples of specific suitable polyethylenic - functional monomers containing two or three ethylenically unsaturated groups include trimethylolpropanetriacrylate (TMPTA), tetraethylene glycol diacrylate (TTEGDA), tripropylene glycol diacrylate (TRPGDA), hexanedioldimethacrylate (HDDMA), and hexanedioldiacrylate (HDDA).

A wide variety of photoinitiator compounds may be used to initiate the polymerization of the lens forming composition. The following are examples of illustrative photoinitiator compounds within the scope of the invention: 2-hydroxy-2-methyl-1-phenylpropan-1-one, 1-hydroxycyclohexyl phenyl ketone, 2,2-di-sec-butoxyacetophenone, 2,2-diethoxyacetophenone, 2,2-diethoxy-2-phenyl-acetophenone, 2,2-dimethoxy-2-phenyl-acetophenone, benzoin methyl ether, benzoin isobutyl ether, benzoin, benzil, benzyl disulfide, 2,4-dihydroxybenzophenone, benzylideneacetophenone, and acetophenone. An especially preferred photoinitiator compound is 1-hydroxycyclohexyl phenyl ketone which is commercially available from Ciba-Geigy as Irgacure 184.

As noted above, styrene having a formula of

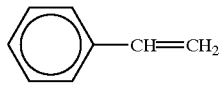

may optionally be present in the polymerizable composition.

Another material which may optionally be present in the polymerizable composition is a mold release agent. When used, the mold release agent is employed in the composition in amounts sufficient to ensure that the subsequently produced lens releases easily from the mold without breaking or cracking. The mold release agent should be compatible with the polymerizable composition and should not adversely affect the physical properties of the subsequently produced lens. More particularly, the mold release agent should not adversely affect the physical properties most characteristic of the subsequently produced lens such as its rigidity, hardness, index of optical refraction, transmission of visible light and absence of coloring which affects optical clarity. The mold release agent should, therefore, be a liquid or, if a solid, be soluble in the polymerizable composition.

Mold release agents that may be used include alkyl phosphates and stearates. Among the alkyl phosphates that may be used as a mold release agent are the mono and dialkyl phosphates (and mixtures of mono and dialkyl phosphates) which are commercially available from E.I. DuPont de Nemours & Co. under the trade names ZELEC® UN and ZELEC® NE. These alkyl phosphates are reported to have straight chain alkyl groups of from 16 to 18 carbon atoms.

Other mold release agents that may be used include stearic acid, esters of stearic acid and the metal salts of stearic acid, e.g., stearic acid salts of the metals zinc, calcium, lead, magnesium, barium, cadmium, aluminum, and lithium. Other fatty acids and fatty acids salts may also be used, provided that they do not adversely affect the physical properties of the casting. Other mold release agents known to the art such as dioctylphthalate may be used.

Dyes and/or pigments are optional materials that may be present when high transmission of light is not necessary.

The listing of optional ingredients discussed above is by no means exhaustive. These and other ingredients may be employed in their customary amounts for their customary purposes so long as they do not seriously interfere with good polymer formulating practice.

According to a preferred embodiment of the present invention, the preferred aromatic-containing bis(allyl carbonate) functional monomer, bisphenol A bis(allyl carbonate) is admixed with one or more faster reacting polyethylenic functional monomers containing two acrylate or methacrylate groups such as hexanediol dimethacrylate (HDDMA), hexanediol diacrylate (HDDA), tetraethylene glycol diacrylate (TTEGDA), and tripropylene glycol diacrylate (TRPGDA) and optionally a polyethylenic functional monomer containing three acrylate groups such as trimethylolpropane triacrylate (TMPTA). According to another preferred embodiment of the present invention, one or more polyethylenic functional monomers containing two acrylate or methacrylate groups such as HDDMA, TTEGDA and TRPGDA is optionally admixed with a polyethylenic functional monomer containing three acrylate groups such as TMPTA. According to a further preferred embodiment of the present invention a polyethylenic functional monomer containing three acrylate groups such as TMPTA is optionally admixed with one or more polyethylenic functional monomers containing two acrylate or methacrylate groups such as HDDMA, TTEGDA and TRPGDA. Generally, compounds containing acrylate groups polymerize much faster than those containing allyl groups. Thus, by including the fast polymerizing polyethylenic functional monomers in the polymerizable lens composition, yellowing is reduced because less initiator is required to complete the polymerization process.

TTEGDA has a very long and flexible backbone between its two acrylate groups, so compositions including a high proportion of TTEGDA on the order of 70% by weight tend to be quite flexible. Preferably, other monomers that provide more stiffness are included in the composition and the proportion of TTEGDA is reduced. Stiffness is provided, preferably; by incorporating monomers that have shorter and stiffer backbones than TTEGDA such as HDDMA or TRPGDA. Stiffness may be provided, according to some embodiments of the present invention, by incorporating polyethylenic functional monomers containing three acrylate groups such as trimethylolpropane triacrylate (TMPTA).

To reduce the formation of cracks in the lenses, it is preferable to reduce the rate of polymerization and reduce the maximum temperature of the lens composition during the curing process. Generally, if there is a large enough temperature difference between the hardening lens and its surroundings, the lens will crack.

The rate of polymerization and the maximum temperature are reduced, preferably, by optimizing three factors: monomer composition, initiator concentration and incident light intensity. The rate of polymerization, preferably, is sufficiently reduced by decreasing the concentration of photoinitiator and by decreasing the intensity of the incident light. TTEGDA and TRPGDA are very fast reacting monomers although TRPGDA reacts slightly slower than TTEGDA. The higher the proportion of TTEGDA, the faster the reaction, the higher the shrinkage of the lens, the greater the heating effect and the more susceptible the lens is to cracking or premature release from the mold. Slower reacting monomers, preferably, are mixed with these very reactive monomers to bring the rate of polymerization under control and reduce the rate of heat generation. A balance is achieved between slower monomers and very reactive monomers to avoid lens cracking while at the same time providing a rapid enough rate of polymerization to minimize the concentration of initiator and diminish yellowing.

Conventional high pressure mercury arc lamps used to cure plastic lenses were found to have a detrimental effect on the quality of the produced lens. Aside from being cumbersome, expensive and dangerous, these high intensity lamps contributed to the rapid rise in temperature as well as the rate of polymerization. According to this embodiment of the present invention, conventional high pressure mercury arc lamps are replaced by bulbs that generate approximately 5–10 mW/sqcm of ultraviolet light having wavelengths between 300 and 400 nm, which light is very uniformly distributed without any sharp discontinuities throughout the reaction process. Such bulbs are commercially available from Sylvania under the trade designation Sylvania Fluorescent (F158T/2052) or Sylvania Fluorescent (F258T8/350BL/18") GTE. As noted above, ultraviolet light having wavelengths between 300 and 400 nm is preferred because most of the preferred photoinitiators of the composition of the present invention absorb most efficiently at this wavelength and the molds used according to the present invention allow a maximum transmission at this wavelength.

It is preferred that a filter be placed between the light source and the reaction cell to absorb all or substantially all incident light having a wavelength less than 300 nm. Light having a wavelength below 300 nm does not induce polymerization but is absorbed by the monomers and produces a great deal of heat. Also, if the full intensity of the ultraviolet source is allowed to strike the mold, it may break the mold due to a strong absorption of short wavelength radiation by the glass. The filter, preferably, is a glass filter that can withstand a fair degree of temperature gradation with its surroundings and absorb all wavelengths below 300 nm, such as a borosilicate filter or a commercially available filter from Pyrex, Kimax or Crown Glass.

It is preferred according to the present invention that the light source generates light having substantially uniform intensity. It is also preferred that the incident light have no sharp discontinuities to reduce the possibility of lens cracking. Moreover, it is preferred that there be no sharp intensity gradients of ultraviolet radiation either horizontally or vertically through the lens composition during the curing process because sharp intensity gradients through the lens lead to defects in the finished lens. It is preferred that several light sources configured as a bank of lights be utilized to generate the uniform light. It is also preferred that a suitable light diffuser be disposed between the light source and the reaction solution to maximize the diffusers include frosted glass molds or one or more sheets of tracing paper.

It is preferred that the maximum temperature of the lens forming composition during the cure thereof be less than 50° C. to reduce the tendency of the lens to fracture. In addition to the above-noted techniques for reducing the temperature, filters disposed between the light source and the reaction cell, as well as cooling fans to carry heat away from the reaction cell may be used to reduce the heating effects. Finally, when curing thick positive lenses, intermittent rather than continuous radiation is effective to reduce the heating effect.

According to one embodiment of the present invention, the liquid lens forming composition includes bis phenol A bis(allyl carbonate) as a major liquid monomer in place of DEG-BAC. The bisphenol A bis(allyl-carbonate) monomer has a higher refractive index than DEG-BAC which allows the production of thinner lenses which is especially important with relatively thick positive or negative lenses.

Commercially available preparations having utility in the present invention which include bisphenol A bis(allyl carbonate) as their major component are available from PPG Inc. under the trade name HIRI II.

In one of its commercially available forms, HIRI II includes approximately 91% bisphenol A bis(allyl carbonate), 7% DEG-BAC and 2% antiyellowing additives. The antiyellowing additives are UV blockers which absorb strongly at 326 nm. in the region where the photoinitiators absorb. The antiyellowing additives, preferably, are removed before the material is used in a photochemical polymerization reaction. This component, preferably, is removed by passing the HIRI through a column of alumina (basic). Because of its high viscosity, the HIRI II material is preferably mixed with the less viscous TTEGDA before passing it through an alumina column.

When used in the composition of the present invention, it is preferred that the bisphenol A bis(allyl carbonate) monomer be obtained without DEG-BAC or the antiyellowing additives. Lenses made from this product sometimes have a very slight, barely detectable, degree of yellowing. A small amount of a blue dye consisting of 9, 10-anthracenedione, 1-hydroxy-4-[(4-methylphenyl)amino] available as Thermoplast Blue 684 from BASF Wyandotte Corp. is preferably added to the composition to counteract the yellowing.

According to a preferred embodiment, the composition of the present invention includes (a) bisphenol A-bis(allyl carbonate); (b) at least one of HDDMA, TTEGDA and TRPGDA; and (c) a photoinitiator. According to this embodiment the composition may optionally include one or more of TMPTA, styrene, a mold release agent, and a dye.

According to another preferred embodiment, the composition of the present invention includes (a) at least one of HDDMA, TTEGDA and TRPGDA; and (b) a photoinitiator. According to this embodiment the composition may optionally include one or more of TMPTA, styrene, a mold release agent: and a dye.

According to still another preferred embodiment, the composition of the present invention includes (a) TMPTA;

and (b) a photoinitiator. According to this embodiment the composition may optionally include one or more of bisphenol. A-bis(allyl carbonate), HDDMA, TTEGDA, TRPGDA, styrene, a mold release agent and a dye.

According to a further preferred embodiment, the composition of the present invention includes (a) up to 70 percent by weight of bisphenol A bis(allyl carbonate); (b) up to 100 percent by weight of HDDMA; (a) up to 100 percent: by weight of TTEGDA; (d) up to 100 percent by weight of TRPGDA; (e) up to 100 percent by weight of TMPTA; (f) up to 20 percent by weight of styrene; (g) from about 0.01 to about 2.5 percent by weight of 1-hydroxycyclohexylphenyl ketone; and (h) an effective amount of a mold release agent.

According to a more preferred embodiment, the composition includes 19.0% by weight of bisphenol A bis(allyl carbonate), 15.0% by weight of HDDMA, 17.5% by weight of TTEGDA, 31.0% by weight of TRPGDA, 17.5% by weight of TMPTA, 0.013% by weight of 1-hydroxycyclohexylphenyl ketone and an effective amount of a mold release agent.

According to a preferred embodiment, the composition of the present invention includes (a) bisphenol A-bis(allyl carbonate), (b) a mixture of HDDMA, TTEGDA and TRPGDA; (c) TMPTA; (d) styrene; (e) a photoinitiator; and (f) a mold release agent.

According to a more preferred embodiment, the composition includes from about 22–29% by weight of bisphenol A bis(allyl carbonate), from about 13–26% by weight of HDDMA, from about 12–19% by weight of TTEGDA, and from about 12–19% by weight of TRPGDA; from about 15–19% by weight of TMPTA; from about 2–3% by weight styrene; from about 0.02–0.04% by weight of 1-hydroxycyclohexylphenyl ketone as a photoinitiator; and an effective amount of a mold release agent.

According to a most preferred embodiment, the composition includes 26% by weight of bisphenol A bis(allyl carbonate), 25% by weight of HDDMA, 15% by weight of TTEGDA, 16% by weight of TRPGDA, 16% by weight of TMPTA, 2% by weight of styrene, 0.02% by weight of 1-hydroxycyclohexylphenyl ketone and an effective amount of a mold release agent.

As discussed above, bisphenol A bis(allyl carbonate) has a much higher refractive index than DEG-BAC and thus allows the production of thinner lenses when compared to DEG-BAC lenses. If more than 30% by weight of bisphenol A-bis(allyl carbonate) is included in the most preferred composition, however, compatability or solubility problems between the various monomers develop resulting in a cloudy, foggy or milky lens.

TTEGDA is a diacrylate monomer that, preferably, is included in the composition because it is a fast polymerizing monomer that reduces yellowing and yields a very clear product. If too much TTEGDA is included in the most preferred composition, i.e. greater than about 18% by weight, however, the finished lens will be prone to cracking and will be too flexible as this material softens at temperatures above 40° C. If TTEGDA is excluded altogether, the finished lens tends to be brittle.

HDDMA is a dimethacrylate monomer that has a very stiff backbone between the two methacrylate groups. HDDMA, preferably, is included in the composition because it yields a stiffer polymer and increases the hardness and strength of the finished lens. This material is also quite compatible with the bisphenol A bis(allyl carbonate) monomer. HDDMA contributes to high temperature stiffness, polymer clarity and speed of polymerization.

TRPGDA is a diacrylate monomer that, preferably, is included in the composition because it provides good strength and hardness without adding brittleness to the finished lens. This material is also stiffer than TTEGDA.

TMPTA is a triacrylate monomer that, preferably, is included in the composition because it provides much more crosslinking in the finished lens than the difunctional monomers. TMPTA has a shorter backbone than TTEGDA and increases the high temperature stiffness and hardness of the finished lens. Moreover, this material contributes to the prevention of patterns in the finished lens. TMPTA also contributes to high shrinkage during polymerization. The inclusion of too much of this material in the most preferred composition, i.e. in excess of 20% by weight makes the finished lens too brittle so that it breaks under the drop-ball test.

Styrene is a high refractive index comonomer that, preferably, is included in the composition because it acts as a coordinating material. If styrene is not included in some compositions according to the present invention, incompatability problems may arise which result in a cloudy lens. Styrene appears to act as a bridging agent which allows the bisphenol A bis(allyl carbonate) to polymerize with the other monomers. The inclusion of too much styrene in the most preferred composition, i.e. greater than about 3% by weight will result in a loss of strength in the finished lens, because styrene is a single vinyl group monomer.

Certain of the monomers that are preferably utilized in the composition of the present invention, such as TTEGDA, TRPGDA and TMPTA, include impurities and have a yellow color in certain of their commercially available forms. The yellow color of these monomers is preferably removed by passing them through a column of alumina (basic) which includes aluminum oxide powder - basic. After passage through the alumina column, the monomers absorb almost no ultraviolet light. Also after passage through the alumina column differences between monomers obtained from different sources are substantially eliminated. It is preferred, however, that the monomers be obtained from a source which provides the monomers with the least amount of impurities contained therein. The styrene, preferably, is also passed through a column of alumina (basic) before use. The composition preferably is filtered prior to polymerization thereof to remove suspended particles.

The photoinitiator included in the composition, preferably, is 1-hydroxycyclohexylphenyl ketone which is available from Ciba Geigy as Irgacure 184. The initiator concentration to a large extent is dependent on the incident light intensity and the monomer composition. An excess of Irgacure 184 will cause yellowing in the lens and will cause the reaction to proceed too rapidly leading to a cracked lens.

A mold release agent, preferably, is included in the composition so the finished lens will not stick to the mold or gasket after it has cured. The effective amount of mold release agent is very small. Large amounts of mold release agent lead to deposits on the molds that are present on the finished lenses. Suitable mold release materials may be selected from butyl stearate, ZELEC® UN or ZELEC® NE and dioctylphthalate. The composition, preferably, includes 50–150 ppm of butyl stearate, 0.5–1.5 ppm of ZELEC® UN or ZELEC® NE, or 0.3–1.5 ppm of dioctylphthalaate.

It is preferred that only one of the enumerated mold release agents and not a combination thereof is used. It is preferable to incorporate the mold release agent in the lens composition rather than spraying it on the surface of the mold faces. While coating the mold faces with a mold release agent such as butyl stearate provides effective mold release it also generates microscopic surface anomalies in the lenses. Such surface anomalies detract from the quality of the finished lens and lenses produced from such systems do not tint uniformly.

As noted above, TTEGDA and TRPGDA are highly reactive monomers, with TTEGDA being slightly more active than TRPGDA. Slower reacting monomers such as TMPTA and HDDMA, preferably, are mixed with the very reactive monomers to bring the rate of polymerization under control and reduce the rate of heat generation. The degree of yellowing, preferably, is diminished by increasing the proportion of TTEGDA or TRPGDA to increase the reaction rate and reduce the concentration of initiator. Lens hardness depends on a balance between initiator concentration, exposure time, and formulation. The ultraviolet light cured lenses of the present invention demonstrate excellent organic solvent resistance to acetone, methylethyl ketone, and alcohols. The lenses produced according to the present invention, preferably, are cured in approximately 15 to 30 minutes.

A reaction cell was also developed according to the present invention. The reaction cell can be used with a proper mold arrangement to prepare positive or negative lenses that are free from defects.

Figure 6:
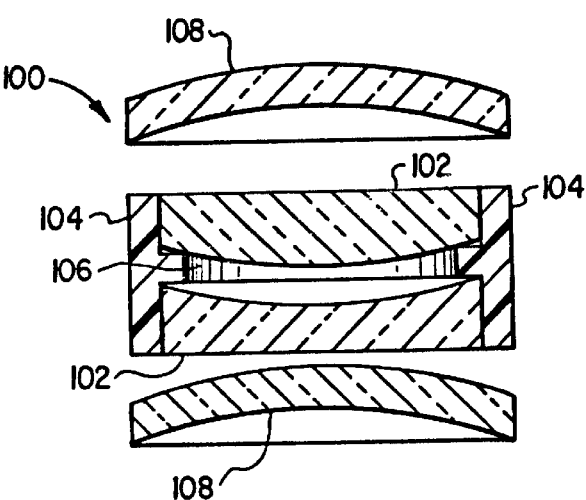
FIG. 6 is a fragmentary cross-sectional view of an apparatus for producing a plastic lens according to the present invention.

A first embodiment of the reaction cell of the present invention is shown in FIG. 6. As shown in FIG. 6, the reaction cell generally indicated at 100 includes opposed glass mold parts 102 and a gasket device 104 which together form a lens molding chamber 106. The polymerizable lens forming composition of the present invention is disposed within the lens molding chamber 106. The glass mold parts 102, gasket device 104 and lens molding chamber 106 are sandwiched between opposed radiation lenses 108. In this manner, incident light entering the reaction cell 100 must first pass through one of the radiation lenses 108.

Figure 7:
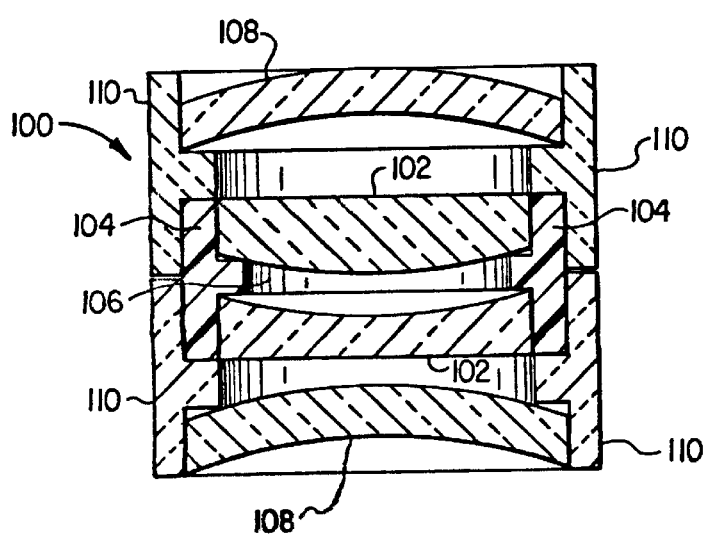
FIG. 7 is a fragmentary cross-sectional view of an apparatus for producing a plastic lens according to the present invention.

FIG. 7 illustrates a second embodiment of the reaction cell of the present invention which includes components identical to some components of the previous embodiment which components are given the same reference numerals. As shown in FIG. 7, the reaction cell 100 includes the opposed glass mold parts 102 and a gasket device 104 which together form the lens molding chamber 106. The polymerizable lens forming composition of the present invention is disposed within the lens molding chamber 106. The glass mold parts 102, gasket device 104 and lens molding chamber 106 are sandwiched between opposed powerless glass molds 108 and thermally insulated by a pair of gaskets 110. The powerless glass molds 108 and gaskets 110 together form a thermally insulated radiation chamber. Preferably, the powerless glass molds 108 have a larger diameter than the lens molding chamber 106 so that incident light is allowed to reach the full extent of the chamber 106. Preferably, tracing paper (not shown) is inserted between the powerless glass molds 108 and the glass mold parts 102. In an alternate preferred embodiment, instead of inserting tracing paper between the powerless glass molds 108 and the glass mold parts 102, the powerless glass molds 108 are replaced by frosted glass molds.

The reaction cell assembly 100 is preferably constructed to minimize heat exchange between the reaction cell and its surroundings. Heat exchange with the surroundings has been found to cause cracking and other problems.

In one embodiment, the gasket 104 is constructed of vinyl material, has good lip finish and maintains sufficient flexibility at conditions around the T(max) of 45° C. In a preferred embodiment the gasket 104 is constructed of silicon material. In another preferred embodiment the gasket 104 is comprised of copolymers of ethylene and vinyl acetate which are commercially available from E. I. DuPont de Nemours & Co. under the trade name ELVAX®. Preferred ELVAX® resins are ELVAX® 350 having a melt index of 17.3–20.9 dg/min and a vinyl acetate content of 24.3–25.7 wt. %, ELVAX® 250 having a melt index of 22.0–28.0 dg/min and a vinyl acetate content of 27.2–28.8 wt. %, ELVAX® 240 having a melt index of 38.0–48.0 dg/min and a vinyl acetate content of 27.2–28.8 wt. %, and ELVAX® 150 having a melt index of 38.0–48.0 dg/min and a vinyl acetate content of 32.0–34.0 wt. %. The gaskets are prepared by conventional injection molding techniques which are well-known by those of ordinary skill in the art.

Premature release often occurs when the molds are held too rigidly by the gasket. There must be sufficient flexibility in the gaskets to permit the molds to follow the lens as it shrinks. Insufficient sealing, unsuitable gasket material and/or a small residual amount of uncured material have been found to contribute to premature release failures.

For best results, both sides of the mold surfaces should be as smooth as possible, with no scratches. They should also have a smooth edge finish. Scratches in the molds have been found to be more important than just producing the same defect in the finished lens. During the reaction free radicals are generated and these free radicals may be sensitive to surface conditions, particularly if no mold release agent is used. Scratches on the surface may initiate cracking and aberrations. Scratches may cause more or less adhesion and premature release often appears to begin at a scratch.

Mold markings cause differential light intensity conditions under the marking, even when the mark is on the outside surface of the mold. The fully exposed region of the lens will be harder, and the sample may have stresses because of this. The portion of the lens under the mark will be weaker at the end of the curing period. This effect has been observed and can cause premature release or induce cracking.

Mold defects at the edges interfere with the sealing conditions and frequently induce premature release.

The present invention will now be described in more detail with reference to the following examples. These examples are merely illustrative of the compositions and method of the invention and are not intended to be limiting. In each of the following examples, the monomer bisphenol A bis(allyl carbonate) was obtained from PPG Industries, Inc.; the tetraethylene glycol dinacrylate (TTEGDA) monomer was obtained from Interez, the 1,6 hexanedioldimethacrylate (HDDMA) monomer was obtained from Rohm Tech, Inc. or Sartomer, the tripropylene glycol diacrylate (TRPGDA) and trimethylolpropanetriacrylate (TMPTA) monomers were obtained from Interez or Sartomer, the styrene monomer was obtained from Fisher and the 1-hydroxycyclohexyl phenyl ketone photosensitizer was obtained from Ciba-Geigy under the trademark Irgacure 184.

EXAMPLE 3

The objective of this Example was to produce optical lenses incorporating bisphenol A bis(allyl carbonate) that were not brittle, had desirable color and clarity, and did not have any patterns, defects or aberrations.

The results of various representative sample formulations are indicated below. In each trial the following conditions were observed:

1. All liquid materials were treated with alumina powder (basic) before use.
2. Sylvania Fluorescent (F158T/2052) lamps which generate an intensity of 5.0 to 6.6 mW/sqcm of UV light were used as a light source. UV light reaching the mold surface, however, was on the order of 1.5 mW/sqcm and the samples were irradiated for approximately 20 minutes.

3. The molds had a diameter of 75 mm.

4. The bisphenol A bis(allyl carbonate) monomer was obtained from PPG Industries, Inc., in a formulation that included 91% by weight bisphenol A bis(allyl carbonate), 7% by weight DEG-BAC and 2% by weight antiyellowing additives. The antiyellowing additives, which are UV absorbers, were removed prior to formulating the compositions.

Formulation 1

A plastic lens composition including a monomer mixture consisting of:

22.12 parts by weight of bisphenol A bis(allyl carbonate), (together with 1.69 parts by weight of DEG-BAC), 15.8 parts by weight of TTEGDA, 15.0 parts by weight of TRPGDA 19.6 parts by weight of TMPTA, 22.3 parts by weight of HDDMA, 3.50 parts by weight of styrene; a photosensitizer consisting of 0.05 parts by weight of 1-hydroxycyclohexyl phenyl ketone; and a mold release agent consisting of 76 ppm of butyl stearate were placed in a reaction chamber disposed between opposed 550 and 775 glass molds configured to generate a positive correction lens. The molds were separated by a distance of 1.8 mm by a vinyl type gasket. The radiation cell was as described above with reference to FIG. 6 and the radiation lenses were negative power lenses.

The composition was irradiated for a period of 17 minutes and exhibited a smooth and slow rate of temperature increase.

The lens was an overall good product exhibiting a favorable appearance in terms of color and clarity and having a flexibility resistance that was better than conventional DEG-BAC lenses.

Formulation 2

A plastic lens composition including a monomer mixture consisting of:

23.70 parts by weight of bisphenol A bis(allyl carbonate), (together with 1.81 parts by weight of DEG-BAC), 15.9 parts by weight of TTEGDA, 15.3 parts by weight of TRPGDA, 16.2 parts by weight of TMPTA, 23.4 parts by weight of HDDMA, 3.60 parts by weight of styrene; a photosensitizer consisting of 0.051 parts by weight of 1-hydroxycyclohexyl phenyl ketone; and a mold release agent consisting of 114 ppm of butyl stearate were placed in a reaction chamber disposed between opposed glass molds configured to generate a positive (2.7 D) correction lens. The glass molds were separated by a vinyl type gasket. The glass molds were washed and treated with methylethyl ketone prior to the reaction. The radiation cell was as described above with reference to FIG. 6 and the radiation lenses were negative power lenses.

The composition was irradiated for a period of 18 minutes and exhibited a smooth reaction that was not too fast and not too slow. The lens did not crack and did not release prematurely. The lens had a flexibility resistance that was better than conventional DEG-BAC lenses. The lens, however, was brittle near its edges which is believed to be caused by slight interference with the incident light caused by the lens molding apparatus.

Formulation 3

A plastic lens composition including a monomer mixture consisting of:

26.10 parts by weight of bisphenol A bis(allyl carbonate) (together with 2.00 parts by weight of DEG-BAC), 14.0 parts by weight of TTEGDA, 16.8 parts by weight of TRPGDA, 14.3 parts by weight of TMPTA, 24.1 parts by weight of HDDMA, 2.60 parts by weight of styrene; a photosensitizer consisting of 0.048 parts by weight of 1-hydroxycyclohexyl phenyl ketone; were placed in a reaction chamber disposed between opposed 660 and 500 glass molds configured to generate a negative correction lens. The molds were separated a distance of 4.8 mm by a gasket. The radiation cell was as described above with reference to FIG. 6. The molds were sprayed with butyl stearate as a mold release agent prior to the curing process.

The composition was irradiated for a period of 20 minutes. The finished lens exhibited no haziness and good hardness but was brittle at its edges. The butyl stearate sprayed on the mold surface led to surface anomalies in the finished lens.

EXAMPLE 4

The objective of this Example was to produce optical lenses incorporating bisphenol A bis(allyl carbonate) that were not brittle, had desirable color and clarity, and did not have any patterns, defects or aberrations.

In each trial of this Example, Sylvania Fluorescent (F158T/2052) lamps which generate an intensity of 5.0 to 6.6 mW/sqcm. of UV light were used as a light source.

The basic ingredients of the formulations according to Example 4 included TTEGDA, TRPGDA, TMPTA, bisphenol A bis(allyl carbonate), styrene and 1-hydroxycyclohexyl phenyl ketone which are commercially available from the sources set forth above.

Zelec® UN was tested as a mold release agent to supplement butyl stearate.

Often, the monomers were passed through beds of alumina (basic) to remove impurities. This was especially true for the monomer TRPGDA.

The results of various representative sample formulations are indicated below.

Sample formulation 4 was irradiated in a reaction cell as described above with reference to FIG. 6.

Each of sample formulations 5–7 and comparative sample formulations 8–9 was irradiated in a reaction cell as described above with reference to FIG. 7.

As shown in FIG. 7, the lens forming chamber 106 is thermally insulated on the sides by gaskets 110. According to this example, the chamber 106 was thermally insulated by two large gaskets 110 having the following dimensions: 92 mm OD, 85 mm ID and 75 mm lip diameter, and on top and bottom by two powerless glass molds 108 having a 76 mm diameter which fit into the large gaskets 110. Three sheets of tracing paper 108 were inserted between the powerless glass ads 108 and the glass rods 102 of the lens forming chamber 106. Heat exchange between the reaction cell and its surroundings was reduced greatly with this arrangement.

Frosted glass in place of the glass molds 108 was tried and worked as well as clear glass molds 108 plus tracing paper. In any case, good sealing was very important to produce high quality lenses.

Gasket material and lip finish were also very important. Most of the trials were carried out using vinyl gaskets that had been used many times so that the quality of the lip had deteriorated making sealing-difficult.

Imperfect sealing and gasket material, plus a small residual amount of uncured material contributed to premature release.

When the lens cavity was not completely sealed, a small amount of air leaked in and prevented the polymerization of the monomer mixture that it reached resulting in some uncured residual liquid remaining at the gasket lip.

Formulation 4

A plastic lens composition including a monomer mixture consisting of:

24.13 parts by weight of bisphenol A bis(allyl carbonate) (together with 1.84 parts by weight of DEG-BAC), 16.05 parts by weight of TTEGDA, 15.64 parts by weight of TRPGDA, 16.59 parts by weight of TMPTA, 23.87 parts by weight of HDDMA, 1.48 parts by weight of styrene; a photosensitizer consisting of 0.02 parts by weight of 1-hydroxycyclohexyl phenyl ketone were placed in a reaction chamber disposed between opposed glass molds configured to generate a bifocal correction lens. The glass molds were separated by silicon gaskets to produce a lens that was 2 mm thick at the edge and 7.7 mm thick in the center. The lens After 20 minutes of irradiation mold release occurred at the bifocal. The ultraviolet light passing through the cell had an intensity of 1.1 mW/sqcm. Under these conditions the t(max) reached 48° C. after 16 minutes of irradiation and fell to 47° C. after 20 minutes of irradiation. After the radiation there was found some residual liquid around the gasket lip. The produced lens had excellent color, no patterns and good hardness. The edge of the lens was not perfect but the lens was still an overall acceptable product.

Formulation 5

A plastic lens composition including a monomer mixture consisting of:

24.15 parts by weight of bisphenol A bis(allyl carbonate) (together with 1.85 parts by weight of DEG-BAC), 16.0 parts by weight of TTEGDA, 15.6 parts by weight of TRPGDA, 16.6 parts by weight of TMPTA, 23.9 parts by weight of HDDMA, 1.8 parts by weight of styrene; and a photosensitizer consisting of 0.02 parts by weight of 1-hydroxycyclohexyl phenyl ketone were placed in a reaction chamber disposed between opposed 550 and 775 glass molds configured to generate a positive 3D correction lens. The glass molds were separated by a distance of 1.8 mm by vinyl gaskets. The lens composition was irradiated for 40 minutes and the finished lens showed no patterns, had good hardness, and good color and clarity.

Formulation 6

A plastic lens composition including a monomer mixture consisting of:

24.15 parts by weight of bisphenol A bis(allyl carbonate) (together with 1.85 parts by weight of DEG-BAC), 16.0 parts by weight of TTEGDA, 15.6 parts by weight of TRPGDA, 16.6 parts by weight of TMPTA, 23.9 parts by weight of HDDMA, 1.8 parts by weight of styrene; and a photosensitizer consisting of 0.02 parts by weight of 1-hydroxycyclohexyl phenyl ketone were placed in a reaction chamber disposed between opposed glass molds configured to generate a positive 5D or 6.5D correction lens. In these trials the glass molds were separated by an ethylene vinyl acetate gasket. The lens compositions were irradiated for 46 minutes and the finished lenses showed no patterns, had good hardness and good color and clarity.

Formulation 7

A plastic lens composition including a monomer mixture consisting of;

24.15 parts by weight of bisphenol A bis(allyl-carbonate) (together with 1.85 parts by weight of DEG-BAC), 16.0 parts by weight of TTEGDA, 15.6 parts by weight of TRPGDA, 16.6 parts by weight of TMPTA, 23.9 parts by weight of HDDMA, 1.8 parts by weight of styrene; and a photosensitizer consisting of 0.02 parts by weight of 1-hydroxycyclohexyl phenyl ketone were placed in a reaction chamber disposed between opposed glass molds configured to generate negative correction lenses. The molds were configured to generate a −1 lens or a −4 lens. The lens composition was irradiated for 40 minutes. The −1 lenses were successfully completed while the −4 lenses prematurely released.

Comparative Formulation 8

A plastic lens composition including a monomer mixture consisting of:

23.97 parts by weight of bisphenol A bis(allyl-carbonate) (together with 1.83 parts by weight of DEG-BAC), 16.1 parts by weight of TTEGDA, 15.5 parts by weight of TRPGDA, 16.3 parts by weight of TMPTA, 24.6 parts by weight: of HDDA, 1.6 parts by weight of styrene; and a photosensitizer consisting of 0.034 parts by weight of 1-hydroxycyclohexyl phenyl ketone were placed in a reaction chamber disposed between opposed 550 and 775 glass molds configured to generate a positive correction lens. The molds were separated by a distance of 1.8 mm. The lens cracked around the central area. The substitution of HDDA for HDDMA was believed to be responsible for this defect.

Comparative Formulation 9

A plastic lens composition including a monomer mixture consisting of:

29.54 parts by weight of bisphenol A bis(allyl carbonate) (together with 2.26 parts by weight of DEG-BAC), 19.2 parts by weight of TTEGDA, 24.3 parts by weight of TRPGDA, 22.7 parts by weight of TMPTA, 1.9 parts by weight of styrene; a photosensitizer consisting of 0.0197 parts by weight of 1-hydroxycyclohexyl phenyl ketone; and a mold release agent consisting of 1.8 ppm of Zelec® UN were placed in a reaction chamber disposed between opposed glass molds configured to generate positive 1D, 3D and 5D correction lenses as well as negative 1D lenses. The produced lenses were not thoroughly cured in the center and were flexible at high temperatures.

EXAMPLE 5

The objective of this Example was to produce optical lenses, incorporating bisphenol A bis(allyl carbonate) that were not brittle, had desirable color and clarity, and did not have any patterns, defects or aberrations.

In each trial of this Example bisphenol A bis(allyl carbonate) was used. It was determined that any yellowing problems in lenses made from bisphenol A bis(allyl carbonate) could be counteracted and overcome by including a very small amount on the order of one drop or from about 0.2 to 0.4 ppm of styrene containing a blue dye including 9,10-anthracenedione, 1-hydroxy-4-[(4-methylphenyl) amino] (available as Thermoplast Blue 684 from BASF Wyandotte Corp.)

In each trial of this Example, Sylvania Fluorescent (F158T/2052) lamps which generate an intensity of 5.0 to 6.6 mW/sqcm of UV light were used as a light source.

Formulation 10A

A plastic lens composition including a monomer mixture consisting of:

24.50 parts by weight of bisphenol A bis(allyl carbonate), 16.2 parts by weight of TTEGDA, 16.7 parts by weight of TRPGDA, 16.7 parts by weight of TMPTA, 22.7 parts by weight of HDDMA, 3.0 parts by weight of styrene; a photosensitizer consisting of 0.023 parts by weight of 1-hydroxycyclohexyl phenyl ketone; and a mold release agent consisting of 0.7 ppm of Zelec® UN were placed in a reaction chamber disposed between opposed 660 and 520 glass molds configured to generate a negative correction lens. The molds were separated a distance of 4.8 mm by a gasket. The lens composition was irradiated for approximately 20 minutes.

The intensity of ultraviolet light entering the mold was 2.2 mW/sqcm from above and 2.5 mW/sqcm from below.

Frosted glass was used in place of the insulating powerless glass molds.

The finished lens had good color and clarity, no patterns and good hardness without brittleness.

Formulation 10B

A plastic lens composition including a monomer mixture consisting of:

24.50 parts by weight of bisphenol A bis(allyl carbonate), 16.2 parts by weight of TTEGDA, 16.7 parts by weight of TRPGDA, 16.7 parts by weight of TMPTA, 22.7 parts by weight of HDDMA, 3.0 parts by weight of styrene; a photosensitizer consisting of 0.023 parts by weight of 1-hydroxycyclohexyl phenyl ketone; and a mold release agent consisting of 0.7 ppm of Zelec® UN were placed in a reaction chamber disposed between opposed 550 and 775 glass molds configured to generate a positive correction lens. The molds were separated a distance of 1.8 mm by a gasket. The lens composition was irradiated for approximately 20 minutes.

The intensity of ultraviolet light entering the mold was 2.2 mW/sqcm from above and 2.5 mW/sqcm from below.

Instead of frosted glass, clear radiation lenses were used and tracing paper was used over the lamps with 2 sheets at top and 1 sheet at bottom.

The finished lens had more favorable characteristics than the lens of Formulation 10A.

Formulation 11

A plastic lens composition including a monomer mixture consisting of:

25.60 parts by weight of bisphenol A bis(allyl carbonate), 15.1 parts by weight of TTEGDA, 16.1 parts by weight of TRPGDA, 16.5 parts by weight of TMPTA, 24.1 parts by weight of HDDMA, 2.5 parts by weight of styrene; a photosensitizer consisting of 0.0195 parts by weight of 1-hydroxycyclohexyl phenyl ketone; and a mold release agent consisting of 1.0 ppm of Zelec® UN were placed in a reaction chamber disposed between opposed 550 and 775 glass molds configured to generate a positive correction lens. The molds were separated a distance of 1.8 mm by a gasket. Two sheets of tracing paper were inserted between the powerless glass mold and the lens forming mold on both sides of the reaction cell. The lens composition was irradiated for approximately 23 minutes.

The finished lens showed favorable characteristics.

Formulation 12

A plastic lens composition including a monomer mixture consisting of:

25.10 parts by weight of bisphenol A bis(allyl-carbonate), 15.5 parts by weight of TTEGDA, 16.3 parts by weight of TRPGDA, 16.7 parts by weight of TMPTA, 23.6 parts by weight of HDDMA, 2.7 parts by weight of styrene; a photosensitizer consisting of 0.021 parts by weight of 1-hydroxycyclohexyl phenyl ketone; a mold release agent consisting of 0.88 ppm of Zelec® UN and one drop of styrene containing a blue dye including 9,10-anthracenedione, 1-hydroxy-4-[(4-methylphenyl) amino] (available as Thermoplast Blue 684 from BASF Wyandotte Corp.) were placed in a reaction chamber disposed between opposed 550 and 775 glass molds configured to generate a positive 2D correction lens. The molds were separated a distance of 1.8 mm by a gasket. The lens composition was irradiated for approximately 36 minutes.

The intensity of ultraviolet light entering the mold was 1.5 mW/sqcm from above and 2.4 mW/sqcm from below.

The finished lens showed good color, was free of distortion and was more rigid than conventional thermally cured DEG-BAC lenses. The lens also passed the safety drop-ball test after it had been in boiling water for 10 minutes.

Formulation 13

A plastic lens composition including a monomer mixture consisting of:

25.82 parts by weight of bisphenol A bis(allyl-carbonate), 15.06 parts by weight of TTEGDA, 16.05 parts by weight of TRPGDA, 16.30 parts by weight of TMPTA, 24.00 parts by weight of HDDMA, 2.76 parts by weight of styrene; a photosensitizer consisting of 0.025 parts by weight of 1-hydroxycyclohexyl phenyl ketone; and a mold release agent consisting of 0.3 ppm of dioctylphthalate (available from Aldrich) were placed in a reaction chamber disposed between opposed 415 and 775 glass molds configured to generate a positive 4D correction lens. The molds were separated a distance of 1.8 mm by a gasket. The lens composition was irradiated for approximately 25 minutes.

The finished lens showed favorable characteristics.

Comparative Formulation 14

A plastic lens composition including a monomer mixture consisting of:

26.70 parts by weight of bisphenol A bis(allyl-carbonate), 15.5 parts by weight of TTEGDA, 16.0 parts by weight of TRPGDA, 16.4 parts by weight of TMPTA, 22.4 parts by weight of HDDMA, 3.0 parts by weight of styrene; a photosensitizer consisting of 0.0204 parts by weight of 1-hydroxycyclohexyl phenyl ketone; and a mold release agent consisting of 2.5 ppm of Zelec® UN were placed in a reaction chamber disposed between opposed 550 and 775 glass molds configured to generate a positive correction lens. The molds were separated a distance of 1.8 mm by a gasket. The lens composition was irradiated for approximately 22 minutes.

The intensity of ultraviolet light at the surface of the light source was 4.8 mW/sqcm. The intensity of ultraviolet light entering the mold was 3.6 mW/sqcm. The intensity of ultraviolet light exiting the mold was 1.5 mW/sqcm.

The finished lens showed a negligible degree of patterns and had good color. The patterns that were developed in this lens were believed to be caused by too high a proportion of Zelec® UN.

Comparative Formulation 15

A plastic lens composition including a monomer mixture consisting of:

26.50 parts by weight of bisphenol A bis(allyl-carbonate), 16.2 parts by weight of TTEGDA, 16.8 parts by weight of TRPGDA, 17.1 parts by weight of TMPTA, 23.3 parts by weight of HDDMA, a photosensitizer consisting of 0.0277 parts by weight of 1-hydroxycyclohexyl phenyl ketone; and a mold release agent consisting of 1.3 ppm of Zelec® UN were placed in a reaction chamber disposed between opposed 550 and 775 glass molds configured to generate a positive correction lens. The glass molds were separated a distance of 1.8 mm by a gasket. The lens composition was irradiated for approximately 16 minutes. The lens had a slightly frosty appearance and was slightly yellow.

This trial demonstrates that for some compositions the absence of styrene in the formulation will lead to a lens having a frosty appearance.

The yellow appearance was caused by a rapid temperature rise during the curing process.

The following are additional examples of illustrative polymeric compounds within the scope of the present invention. In each of the following examples bisphenol A bis(allyl carbonate) was received from PPG Industries, Inc. in a form that included only the bisphenol A bis(allyl carbonate) monomer. Each acrylate monomer was treated separately through an alumina column (approximately 60–70 g alumina/500 g monomer) in a 2 cm diameter column. ZELEC® UN was used as a mold release agent at a rate of 1.0 ppm based on the total weight of the composition. All samples were subjected to ultraviolet radiation for 30 minutes. The lens samples to be prepared were about –½D with a central thickness of about 2.2 mm and an edge thickness of about 2.8 mm. Silicone gaskets with 3 mm lips were used for all tests.

In Table V below the following abbreviations have the following meanings:

HIRI means the bisphenol A bis(allyl carbonate) monomer, Irg. 184 means Irgacure 184, HD means hardness, FL means flexibility, HZ means haziness, Y means yellowness, NO means not observed, neg. means negligible, L means low, M means medium, H means high, and TPb means Thermoplast Blue 684 blue dye.

Also in Table V below all monomer concentrations are expressed in terms of percent by weight.

TABLE V

| HIRI | TMPTA | TTEGDA | TRPGDA | HDDMA | styrene | Irg. 184 | HD | FL | HZ | Y | Comments |
|---|---|---|---|---|---|---|---|---|---|---|---|
| 0 | 100 | | | | | 0.036 | 85 | L | NO | H | |
| 25 | 75 | | | | | 0.108 | 88 | L | NO | H | |
| 50 | 50 | | | | | 0.299 | 86 | L | neg. | HH | |
| 47 | 47 | | | | 6 | 0.281 | 85 | L | NO | H | |
| 75 | 25 | | | | | 1.09 | 85 | L | neg. | HH | |
| 70.5 | 23.5 | | | | 6 | 1.02 | 85 | L | NO | H | |
| 0 | | 100 | | | | 0.0025 | 76 | L | NO | M–H | |
| 25 | | 75 | | | | 0.0086 | 66 | L–M | NO | M | |
| 50 | | 50 | | | | 0.016 | 52 | M–H | H | L | difficult demolding |
| 47 | | 47 | | | 6 | 0.015 | 45 | H | neg. | L | difficult demolding |
| 75 | | 25 | | | | 0.50 | 65 | H–M | H | L | difficult demolding |
| 70.5 | | 23.5 | | | 6 | 0.47 | 48 | H | neg. | L | difficult demolding |
| 48.5 | | 48.5 | | | 3 | 0.13 | 74 | L | L | M | difficult demolding |
| 0 | | | 100 | | | 0.006 | 77 | L | NO | neg. | |
| 25 | | | 75 | | | 0.0186 | 76 | M | NO | L–neg. | |
| 50 | | | 50 | | | 0.036 | 63 | M–H | L | L | difficult demolding |
| 48.5 | | | 48.5 | | 3 | 0.063 | 70 | L–M | L | L | difficult demolding |
| 47 | | | 47 | | 6 | 0.034 | 50 | H | neg. | neg. | difficult demolding |
| 75 | | | 25 | | | 0.70 | 75 | L | L | M | difficult demolding |
| 70.5 | | | 23.5 | | 6 | 0.66 | 61 | L–M | L | L | difficult demolding |
| 0 | | | | 100 | | 0.008 | 58 | M | NO | neg. | |
| 25 | | | | 75 | | 0.021 | 68 | M | NO | M | cracked at edge |
| 50 | | | | 50 | | 0.036 | 66 | L | M | L–M | |
| 47 | | | | 47 | 6 | 0.034 | 61 | L–M | neg. | L–M | |
| 75 | | | | 25 | | 0.67 | 75 | L–M | H | L–M | |
| 70.5 | | | | 23.5 | 6 | 0.63 | 60 | L | neg. | M | |
| 0 | | | | | | 0.0035 | 68 | L | NO | neg. | 100% HDDA |
| 25 | | | | | | 0.015 | 79 | L | neg. | L | 75% HDDA |
| 50 | | | | | | 0.032 | 73 | M | H | L | 50% HDDA |
| 47 | | | | | 6 | 0.03 | 68 | M | neg. | L | 47% HDDA |
| 75 | | | | | | 0.62 | 75 | L | H | M | 25% HDDA |
| 70.5 | | | | | 6 | 0.58 | 63 | LM | neg. | M | 23.5% HDDA |
| 20 | 20 | 60 | | | | 0.04 | 84 | L | NO | MH | |
| 20 | 60 | 20 | | | | 0.1 | 87 | L | NO | H | cracked while demolding |
| 19 | 19 | 57 | | | 5 | 0.04 | 84 | L | NO | H | partly released |
| 19 | 57 | 19 | | | 5 | 0.1 | 85 | L | NO | HH | |
| 33.3 | 33.3 | | 33.3 | | | 0.098 | 85 | L | NO | H | |
| 10 | 60 | | 30 | | | 0.070 | 86 | L | NO | H | released |
| 10 | 30 | | 60 | | | 0.0257 | 83 | L | NO | H | |
| 30 | 60 | | 10 | | | 0.138 | 87 | L | NO | H | |
| 60 | 30 | | 10 | | | 0.393 | 83 | L | L | H | |

TABLE V-continued

| HIRI | TMPTA | TTEGDA | TRPGDA | HDDMA | styrene | Irg. 184 | HD | FL | HZ | Y | Comments |
|---|---|---|---|---|---|---|---|---|---|---|---|
| 30 | 10 |  | 60 |  |  | 0.095 | 81 | L | NO | M | cracked at edge while demolding |
| 60 | 10 |  | 30 |  |  | 0.317 | 77 | L | M | M | released |
| 20 | 20 |  | 60 |  |  | 0.05 | 83 | L | NO | M |  |
| 20 | 60 |  | 20 |  |  | 0.1 | 87 | L | NO | MH | cracked while demolding |
| 19 | 19 |  | 57 |  | 5 | 0.05 | 83 | L | NO | M |  |
| 19 | 57 |  | 19 |  | 5 | 0.1 | 87 | L | NO | H | cracked at edge while demolding |
| 20 | 60 |  |  | 20 |  | 0.1 | 85 | L | NO | H | cracked while demolding |
| 20 | 20 |  |  | 60 |  | 0.05 | 77 | LM | NO | M |  |
| 19 | 57 |  |  | 19 | 5 | 0.1 | 85 | L | NO | H |  |
| 19 | 19 |  |  | 57 | 5 | 0.05 | 75 | M | NO | M |  |
| 20 |  | 20 | 60 |  |  | 0.025 | 80 | L | NO | LM | released, cracked during UV exposure |
| 20 |  | 60 | 20 |  |  | 0.025 | 80 | L | NO | LM |  |
| 19 |  | 19 | 57 |  | 5 | 0.025 | 77 | L | NO | LM |  |
| 19 |  | 57 | 19 |  | 5 | 0.025 | 77 | L | NO | LM |  |
| 20 |  | 60 |  | 20 |  | 0.025 | 79 | L | NO | L |  |
| 20 |  | 20 |  | 60 |  | 0.025 | 79 | L | NO | LL |  |
| 19 |  | 57 |  | 19 | 5 | 0.025 | 80 | L | NO | L |  |
| 19 |  | 19 |  | 57 | 5 | 0.025 | 77 | L | NO | L |  |
| 20 |  |  | 60 | 20 |  | 0.025 | 80 | L | NO | L |  |
| 20 |  |  | 20 | 60 |  | 0.025 | 76 | LM | NO | LL |  |
| 19 |  |  | 57 | 19 | 5 | 0.025 | 78 | L | NO | LL |  |
| 19 |  |  | 19 | 57 | 5 | 0.025 | 75 | LM | NO | L |  |
| 20 | 10 | 10 | 60 |  |  | 0.025 | 81 | L | NO | LM |  |
| 20 | 10 | 60 | 10 |  |  | 0.025 | 82 | L | NO | LM | released, cracked at edge |
| 20 | 60 | 10 | 10 |  |  | 0.07 | 87 | L | NO | MH | cracked while demolding |
| 19 | 9.5 | 9.5 | 57 |  | 5 | 0.025 | 80 | L | NO | LM |  |
| 19 | 9.5 | 57 | 9.5 |  | 5 | 0.025 | 81 | L | NO | LM |  |
| 19 | 57 | 9.5 | 9.5 |  | 5 | 0.07 | 86 | L | NO | H |  |
| 20 | 10 | 60 |  | 10 |  | 0.025 | 82 | L | NO | M |  |
| 20 | 60 | 10 |  | 10 |  | 0.06 | 88 | L | NO | H | cracked at edge while demolding |
| 20 | 10 | 10 |  | 60 |  | 0.03 | 80 | L | NO | L |  |
| 19 | 9.5 | 57 |  | 9.5 | 5 | 0.025 | 82 | L | NO | M |  |
| 19 | 57 | 9.5 |  | 9.5 | 5 | 0.06 | 85 | L | NO | H |  |
| 19 | 9.5 | 9.5 |  | 57 | 5 | 0.03 | 75 | L | NO | L | cracked while demolding |
| 20 | 10 |  | 60 | 10 |  | 0.03 | 81 | L | NO | L |  |
| 20 | 60 |  | 10 | 10 |  | 0.07 | 86 | L | NO | H |  |
| 20 | 10 |  | 10 | 60 |  | 0.035 | 80 | L | NO | L |  |
| 19 | 9.5 |  | 57 | 9.5 | 5 | 0.03 | 80 | L | NO | L | cracked while demolding |
| 19 | 57 |  | 9.5 | 9.5 | 5 | 0.07 | 85 | L | NO | H |  |
| 19 | 9.5 |  | 9.5 | 57 | 5 | 0.035 |  | L | NO | L | cracked while demolding |
| 20 |  | 10 | 60 | 10 |  | 0.018 | 78 | L | NO | L |  |
| 20 |  | 60 | 10 | 10 |  | 0.018 | 80 | L | NO | LM | released and cracked at edge |
| 20 |  | 10 | 10 | 60 |  | 0.025 | 78 | LM | NO | LL |  |
| 19 |  | 9.5 | 57 | 9.5 | 5 | 0.018 | 74 | MH | NO | LL |  |
| 19 |  | 57 | 9.5 | 9.5 | 5 | 0.108 | 79 | L | NO | LM |  |
| 19 |  | 9.5 | 9.5 | 57 | 5 | 0.025 | 74 | LM | NO | LM |  |
| 20 | 20 | 20 | 20 | 20 |  | 0.028 | 82 | L | NO | M |  |
| 20 | 10 | 40 | 10 | 20 |  | 0.025 | 81 | L | NO | M |  |
| 20 | 10 | 20 | 10 | 40 |  | 0.025 | 81 | L | NO | M |  |
| 40 | 10 | 20 | 10 | 20 |  | 0.050 | 80 | L | L | M |  |
| 40 | 10 | 20 | 20 | 10 |  | 0.050 | 78 | L | LM | M |  |
| 10 | 10 | 20 | 20 | 40 |  | 0.014 | 80 | L | NO | M | cracked at edge while demolding |
| 40 | 10 | 10 | 20 | 20 |  | 0.050 | 78 | L | LM | M |  |
| 20 | 10 | 10 | 20 | 40 |  | 0.025 | 83 | L | NO | M |  |
| 10 | 10 | 40 | 20 | 20 |  | 0.014 | 81 | L | NO | M |  |
| 20 | 10 | 40 | 20 | 10 |  | 0.025 | 80 | L | NO | M |  |
| 10 | 10 | 20 | 40 | 20 |  | 0.014 | 81 | L | — | M | mold cracked due to alignment error |
| 20 | 10 | 20 | 40 | 10 |  | 0.025 | 81 | L | NO | M |  |
| 20 | 10 | 10 | 40 | 20 |  | 0.025 | 80 | L | NO | M |  |
| 10 | 20 | 40 | 20 | 10 |  | 0.020 | 82 | L | NO | M |  |
| 10 | 20 | 10 | 20 | 40 |  | 0.020 | 81 | L | NO | M |  |
| 40 | 20 | 10 | 20 | 10 |  | 0.060 | 80 | L | L | M |  |
| 40 | 20 | 10 | 10 | 20 |  | 0.062 | 80 | L | L | M |  |

TABLE V-continued

| HIRI | TMPTA | TTEGDA | TRPGDA | HDDMA | styrene | Irg. 184 | HD | FL | HZ | Y | Comments |
|---|---|---|---|---|---|---|---|---|---|---|---|
| 20 | 20 | 10 | 10 | 40 | | 0.030 | 80 | L | NO | M | |
| 40 | 20 | 20 | 10 | 10 | | 0.062 | 82 | L | LM | M | |
| 10 | 20 | 20 | 10 | 40 | | 0.020 | 80 | L | NO | M | |
| 20 | 20 | 40 | 10 | 10 | | 0.030 | 82 | L | NO | M | |
| 10 | 20 | 40 | 10 | 20 | | 0.020 | 82 | L | NO | M | |
| 20 | 20 | 10 | 40 | 10 | | 0.030 | 82 | L | NO | M | |
| 20 | 20 | 10 | 40 | 20 | | 0.020 | 82 | L | NO | M | |
| 10 | 20 | 20 | 40 | 10 | | 0.020 | 82 | L | NO | M | |
| 10 | 40 | 20 | 20 | 10 | | 0.035 | 85 | L | NO | MH | cracked at edge while demolding |
| 10 | 40 | 10 | 20 | 20 | | 0.035 | 85 | L | NO | MH | |
| 20 | 40 | 10 | 20 | 10 | | 0.040 | 85 | L | NO | MH | |
| 10 | 40 | 20 | 10 | 20 | | 0.040 | 86 | L | NO | MH | |
| 20 | 40 | 20 | 10 | 10 | | 0.040 | 85 | L | NO | MH | cracked at edge while demolding |
| 20 | 40 | 10 | 10 | 20 | | 0.040 | 84 | L | NO | MH | cracked at edge while demolding |
| 20 | 40 | 20 | 10 | 10 | | 0.040 | 85 | L | NO | M | cracked while demolding; 0.7 ppm TPb |
| | 80 | | | | 20 | 0.04 | 80 | LM | NO | MH | 30 min. exposure time |
| | | 80 | | | 20 | 0.025 | 80 | L | NO | MH | 1 hour exposure time |
| | | | 80 | | 20 | 0.025 | 82 | L | NO | M | 1 hour exposure time |
| | | | | 80 | 20 | 0.03 | 73 | LM | NO | L | 1 hour exposure time |
| | | | | | 20 | 0.025 | 77 | LM | NO | M | 80% HDDA; 1 hour exposure time |
| | 0 | 100 | | | | 0.0025 | 76 | L | NO | MH | |
| | 25 | 75 | | | | 0.013 | 81 | L | NO | MH | released after cracking during UV exposure |
| | 50 | 50 | | | | 0.019 | 84 | L | NO | MH | cracked while demolding |
| | 47 | 47 | | | 6 | 0.018 | 85 | L | NO | MH | |
| | 75 | 25 | | | | 0.030 | 87 | L | NO | MH | cracked while demolding |
| | 70.5 | 23.5 | | | 6 | 0.028 | 86 | L | NO | H | |
| | 100 | 0 | | | | 0.036 | 85 | L | NO | H | |
| | 0 | | 100 | | | 0.006 | 77 | L | NO | neg. | |
| | 25 | | 75 | | | 0.015 | 80 | L | NO | M | released |
| | 50 | | 50 | | | 0.022 | 85 | L | NO | MH | |
| | 47 | | 47 | | 6 | 0.208 | 83 | L | NO | H | |
| | 75 | | 25 | | | 0.03 | 85 | L | NO | H | |
| | 70.5 | | 23.5 | | 6 | 0.028 | 84 | L | NO | H | |
| | 100 | | 0 | | | 0.036 | 85 | L | NO | H | |
| | 0 | | | 100 | | 0.008 | 58 | M | NO | neg. | |
| | 25 | | | 75 | | 0.0147 | 50 | L | NO | L | |
| | 50 | | | 50 | | 0.022 | 77 | L | NO | M | |
| | 47 | | | 47 | 6 | 0.021 | 72 | LM | NO | M | |
| | 75 | | | 25 | | 0.0305 | 83 | L | NO | MH | cracked at edge while demolding |
| | 70.5 | | | 23.5 | 6 | 0.0287 | 78 | L | NO | M | |
| | 100 | | | 0 | | 0.036 | 85 | L | NO | H | |
| | 0 | | | | | 0.0035 | 68 | L | NO | neg. | 100% HDDA; cracked |
| | 25 | | | | | 0.014 | 74 | M | NO | neg. | 75% HDDA; cracked |
| | 50 | | | | | 0.02 | 80 | LM | NO | L | 50% HDDA; released |
| | 47 | | | | 6 | 0.019 | 82 | L | NO | M | 47% HDDA; released |
| | 75 | | | | | 0.032 | 85 | L | NO | MH | 25% HDDA; released |
| | 70.5 | | | | 6 | 0.03 | 84 | L | NO | H | 23.5% HDDA; released |
| | 100 | | | | | 0.036 | 85 | L | NO | H | 0% HDDA |
| | | 0 | 100 | | | 0.006 | 77 | L | NO | neg. | |
| | | 25 | 75 | | | 0.005 | 76 | L | NO | L | difficult demolding |
| | | 50 | 50 | | | 0.0044 | 77 | LM | NO | L | difficult demolding |
| | | 47 | 47 | | 6 | 0.004 | 74 | L | NO | L | difficult demolding |
| | | 75 | 25 | | | 0.0035 | 72 | L | NO | LM | difficult demolding |
| | | 70.5 | 23.5 | | 6 | 0.0033 | 71 | M | NO | M | released, difficult demolding |
| | | 100 | 0 | | | 0.0025 | 76 | L | NO | MH | |
| | | 0 | | 100 | | 0.008 | 58 | M | NO | neg. | |
| | | 25 | | 75 | | 0.0066 | 70 | LM | NO | neg. | cracked while demolding |
| | | 50 | | 50 | | 0.0052 | 77 | L | NO | neg. | |

TABLE V-continued

| HIRI | TMPTA | TTEGDA | TRPGDA | HDDMA | styrene | Irg. 184 | HD | FL | HZ | Y | Comments |
|---|---|---|---|---|---|---|---|---|---|---|---|
| | | 47 | | 47 | 6 | 0.0049 | 64 | M | NO | neg. | |
| | | 75 | | 25 | | 0.0038 | 77 | L | NO | L | |
| | | 70.5 | | 23.5 | 6 | 0.0036 | 32 | H | NO | neg. | cracked while demolding |
| | | 100 | | 0 | | 0.0025 | 76 | L | NO | MH | |
| | | 0 | | | | 0.0035 | 68 | L | NO | neg. | 100% HDDA cracked after demolding |
| | | 25 | | | | 0.0035 | 72 | M | NO | neg. | 75% HDDA cracked and released |
| | | 50 | | | | 0.0029 | 74 | L | NO | neg. | 50% HDDA |
| | | 47 | | | 6 | 0.0027 | 65 | H | NO | neg. | 47% HDDA |
| | | 75 | | | | 0.0026 | 75 | L | NO | neg. | 25% HDDA cracked and released |
| | | 70.5 | | | 6 | 0.0024 | 74 | LM | NO | neg. | 23.5% HDDA |
| | | 100 | | | | 0.0025 | 76 | L | NO | MH | 0% HDDA |
| | | | 0 | 100 | | 0.008 | 58 | M | NO | neg. | |
| | | | 25 | 75 | | 0.006 | 55 | H | NO | neg. | |
| | | | 50 | 50 | | 0.0063 | 70 | M | NO | neg. | |
| | | | 47 | 47 | 6 | 0.006 | 45 | H | NO | neg. | |
| | | | 75 | 25 | | 0.0065 | 74 | M | NO | neg. | |
| | | | 70.5 | 23.5 | 6 | 0.006 | 43 | H | NO | neg. | |
| | | | 100 | 0 | | 0.006 | 77 | L | NO | neg. | |
| | | | 0 | | | 0.0035 | 68 | L | NO | neg. | 100% HDDA; cracked while demolding |
| | | | 25 | | | 0.0035 | 70 | M | NO | neg. | 75% HDDA; released |
| | | | 50 | | | 0.004 | 75 | LM | NO | neg. | 50% HDDA |
| | | | 47 | | 6 | 0.0037 | 73 | M | NO | neg. | 47% HDDA; difficult demolding |
| | | | 75 | | | 0.0046 | 77 | L | NO | L | 25% HDDA |
| | | | 70.5 | | 6 | 0.0043 | 75 | L | NO | L | 23.5% HDDA |
| | | | 100 | | | 0.006 | 77 | L | NO | neg. | 0% HDDA |
| | | | | 0 | | 0.0035 | 68 | L | NO | neg. | 100% HDDA; cracked after demolding |
| | | | | 25 | | 0.0045 | 68 | M | NO | neg. | 75% HDDA; cracked at edge |
| | | | | 50 | | 0.0057 | 70 | L | NO | neg. | 50% HDDA |
| | | | | 47 | 6 | 0.0053 | 58 | MH | NO | neg. | 47% HDDA |
| | | | | 75 | | 0.0069 | 66 | L | NO | neg. | 25% HDDA |
| | | | | 70.5 | 6 | 0.0064 | 57 | M | NO | neg. | 23.5% HDDA |
| | | | | 100 | | 0.008 | 77 | L | NO | neg. | 0% HDDA |
| | 33.3 | 33.3 | 33.3 | | | 0.014 | 83 | L | NO | MH | released after cracking during UV exposure |
| | 60 | 10 | 30 | | | 0.023 | 85 | L | NO | H | cracked at edge while demolding |
| | 30 | 10 | 60 | | | 0.015 | 82 | L | NO | MH | |
| | 60 | 30 | 10 | | | 0.020 | 83 | L | NO | H | cracked at edge while demolding |
| | 30 | 60 | 10 | | | 0.013 | 84 | L | NO | MH | |
| | 10 | 30 | 60 | | | 0.0077 | 79 | L | NO | M | |
| | 10 | 60 | 30 | | | 0.0066 | 78 | L | NO | M | |
| | 20 | 20 | 60 | | | 0.015 | 83 | L | NO | M | cracked at edge while demolding |
| | 20 | 60 | 20 | | | 0.015 | 83 | L | NO | M | cracked at edge while demolding |
| | 60 | 20 | 20 | | | 0.025 | 86 | L | NO | H | cracked at edge while demolding |
| | 19 | 19 | 57 | | 5 | 0.015 | 82 | L | NO | M | |
| | 19 | 57 | 19 | | 5 | 0.015 | 83 | L | NO | M | |
| | 57 | 19 | 19 | | 5 | 0.025 | 85 | L | NO | H | released after cracking at edge during UV exposure |
| | 20 | 60 | | 20 | | 0.015 | 84 | L | NO | M | |
| | 60 | 20 | | 20 | | 0.025 | 84 | L | NO | MH | cracked at edge while demolding |
| | 20 | 20 | | 60 | | 0.018 | 78 | L | NO | neg. | cracked at edge while demolding |
| | 19 | 57 | | 19 | 5 | 0.015 | 83 | L | NO | M | cracked at edge while demolding |
| | 19 | 19 | | 57 | 5 | 0.018 | 77 | L | NO | L | |
| | 33.3 | | 33.3 | 33.3 | | 0.015 | 80 | L | NO | M | cracked at edge while demolding |
| | 60 | | 30 | 10 | | 0.024 | 82 | L | NO | MH | |
| | 30 | | 60 | 10 | | 0.0152 | 82 | L | NO | M | |

TABLE V-continued

| HIRI | TMPTA | TTEGDA | TRPGDA | HDDMA | styrene | Irg. 184 | HD | FL | HZ | Y | Comments |
|---|---|---|---|---|---|---|---|---|---|---|---|
| | 60 | | 10 | 30 | | 0.0238 | 81 | L | NO | MH | cracked while demolding |
| | 30 | | 10 | 60 | | 0.016 | 72 | LM | NO | M | cracked at edge while demolding |
| | 10 | | 60 | 30 | | 0.0093 | 77 | L | NO | L | |
| | 10 | | 30 | 60 | | 0.0095 | 66 | M | NO | L | cracked |
| | | 20 | 60 | 20 | | 0.005 | 77 | L | NO | L | |
| | | 60 | 20 | 20 | | 0.005 | 80 | L | NO | L | released at edge after cracking at edge during UV exposure |
| | | 20 | 20 | 60 | | 0.008 | 73 | L | NO | L | |
| | | 19 | 57 | 19 | 5 | 0.005 | 75 | L | NO | L | |
| | | 57 | 19 | 19 | 5 | 0.005 | 80 | L | NO | L | cracked while demolding |
| | | 19 | 19 | 57 | 5 | 0.008 | 72 | L | NO | L | |
| | 33.3 | | 33.3 | | | 0.015 | 81 | L | NO | M | 33.3% HDDA; released at edge |
| | 60 | | 30 | | | 0.023 | 83 | L | NO | MH | 10% HDDA; released at edge |
| | 30 | | 60 | | | 0.0147 | 84 | L | NO | M | 10% HDDA |
| | 60 | | 10 | | | 0.023 | 80 | L | NO | MH | 30% HDDA; released; cracked while demolding |
| | 30 | | 10 | | | 0.013 | 78 | L | NO | L | 60% HDDA; cracked, released after cracking |
| | 10 | | 60 | | | 0.0083 | 80 | L | NO | L | 30% HDDA |
| | 10 | | 30 | | | 0.0075 | 78 | L | NO | L | 60% HDDA; cracked, released after cracking |
| | 10 | 10 | 70 | 10 | | 0.01 | 81 | L | NO | LM | |
| | 10 | 70 | 10 | 10 | | 0.01 | 82 | L | NO | M | released |
| | 70 | 10 | 10 | 10 | | 0.027 | 83 | L | NO | H | cracked at edge while demolding |
| | 10 | 10 | 10 | 70 | | 0.013 | 70 | M | NO | LL | difficult demolding |
| | 9.5 | 9.5 | 66.5 | 9.5 | 5 | 0.01 | 79 | L | NO | L | |
| | 9.5 | 66.5 | 9.5 | 9.5 | 5 | 0.01 | 80 | L | NO | M | |
| | 66.5 | 9.5 | 9.5 | 9.5 | 5 | 0.027 | 85 | L | NO | H | |
| | 9.5 | 9.5 | 9.5 | 66.5 | 5 | 0.013 | 66 | MH | NO | LL | |
| | 25 | 25 | 25 | 25 | | 0.015 | 82 | L | NO | M | |
| | 25 | 40 | 25 | 10 | | 0.015 | 83 | L | NO | M | released while cracking |
| | 25 | 10 | 25 | 40 | | 0.015 | 81 | L | NO | M | cracked while demolding |
| | 25 | 25 | 10 | 40 | | 0.015 | 83 | L | NO | M | cracked while demolding |
| | 25 | 40 | 10 | 25 | | 0.015 | 84 | L | NO | M | |
| | 25 | 25 | 40 | 10 | | 0.015 | 81 | L | NO | M | |
| | 25 | 10 | 40 | 25 | | 0.015 | 81 | L | NO | M | |
| | 10 | 25 | 25 | 40 | | 0.010 | 78 | L | NO | L | cracked while demolding |
| | 10 | 40 | 25 | 25 | | 0.010 | 82 | L | NO | M | |
| | 10 | 25 | 40 | 25 | | 0.010 | 80 | L | NO | M | |
| | 40 | 25 | 25 | 10 | | 0.020 | 85 | L | NO | M | cracked while demolding |
| | 40 | 10 | 25 | 25 | | 0.020 | 82 | L | NO | M | cracked while demolding |
| | 40 | 25 | 10 | 25 | | 0.020 | 80 | L | NO | M | cracked while demolding |
| | 25 | 25 | 25 | | | 0.013 | 82 | L | NO | M | 25% HDDA released after cracking |
| | 25 | 40 | 25 | | | 0.013 | 82 | L | NO | MH | 10% HDDA released |
| | 25 | 10 | 25 | | | 0.013 | 82 | L | NO | L | 40% HDDA cracked |
| | 25 | 25 | 10 | | | 0.013 | 82 | L | NO | LM | 40% HDDA released, cracked |
| | 25 | 40 | 10 | | | 0.013 | 83 | L | NO | LM | 25% HDDA released, cracked |
| | 25 | 25 | 40 | | | 0.013 | 82 | L | NO | LM | 10% HDDA |
| | 25 | 10 | 40 | | | 0.013 | 82 | L | NO | M | 25% HDDA |
| | 10 | 25 | 25 | | | 0.008 | 80 | L | NO | L | 40% HDDA cracked while demolding |
| | 10 | 40 | 25 | | | 0.008 | 80 | L | NO | L | 25% HDDA |
| | 10 | 25 | 40 | | | 0.008 | 80 | L | NO | L | 25% HDDA |

TABLE V-continued

| HIRI | TMPTA | TTEGDA | TRPGDA | HDDMA | styrene | Irg. 184 | HD | FL | HZ | Y | Comments |
|---|---|---|---|---|---|---|---|---|---|---|---|
| | 40 | 25 | 25 | | | 0.018 | 84 | L | NO | MH | 10% HDDA cracked while demolding |
| | 40 | 10 | 25 | | | 0.018 | 82 | L | NO | L | 25% HDDA released, cracked |
| | 40 | 25 | 10 | | | 0.018 | 82 | L | NO | LM | 25% HDDA released |

Therefore, it can be seen that the present invention not only provides a method and apparatus for making plastic lenses, but provides lens forming compositions.

It is thus seen that the compositions and process of the present invention provide several advantages. For example, according to certain embodiments of the present invention, the light sources utilized to cure the lens forming composition are safer, easier to use and consume less energy than conventional high pressure mercury arc lamps. Moreover, according to certain embodiments of the present invention a plastic optical lens can be cured in 30 minutes or less. Furthermore, in certain embodiments of the present invention, the lens composition includes monomers having a higher refractive index than conventional monomer materials allowing the production of thinner lenses.

Although not specifically illustrated in the drawings, it is understood that other additional and necessary equipment and structural components will be provided, and that these and all of the components described above are arranged and supported in an appropriate fashion to form a complete and operative system.

It is also understood that variations may be made in the present invention without departing from the spirit and scope of the invention. Of course, other variations can be made by those skilled in the art without departing from the invention as defined by the appended claims.

What is claimed is:

1. A system for making a plastic eyeglass lens, comprising:
   (i) a lens forming apparatus, comprising:
      a first mold member having an inner casting face and an outer non-casting face;
      a second mold member having an inner casting face and an outer non-casting face, the second mold member being spaced apart from the first mold member during use such that the casting faces of the first mold member and the second mold member define a mold cavity, at least a portion of the mold cavity having a thickness of at least about 15 mm;
      a light generator for generating and directing ultraviolet light against at least one of the non-casting faces of the first and second mold members during use;
   (ii) a lens forming composition adapted to cure to form a substantially clear eyeglass lens when cured by exposure to ultraviolet light in the mold cavity, the lens forming composition comprising a photoinitiator and at least one polyethylenic-functional monomer containing at least two ethylenically unsaturated groups selected from acrylyl and methacrylyl, wherein less than about 30% by weight of the composition comprises an aromatic containing bis(allyl carbonate)-functional monomer, and wherein the lens forming composition is curable by exposure to ultraviolet light to form a substantially clear eyeglass lens in a time period of less than one hour; and wherein the system is adapted to cure the lens forming composition to form the substantially clear eyeglass lens with a thickness greater than about 1.5 mm in a time d of less than one hour.

2. The system of claim 1, further comprising an air distributor for directing air across the non-casting face of the first mold member during use, and across the non-casting face of the second mold member during use.

3. The system of claim 1 wherein the composition consists essential of a photoinitiator, at least one polyethylenic-functional monomer containing at least two ethylenically unsaturated groups selected from acrylyl and methacrylyl, and less than about 30% by weight of the composition comprises an aromatic containing bis(allyl carbonate)-functional monomer.

4. The system of claim 1 wherein at least 25% by weight of the composition comprises at least one polyethylenic-functional monomer containing at least two ethylenically unsaturated groups selected from acrylyl and methacrylyl.

5. The system of claim 1 wherein at least 25% by weight of the composition comprises at least one polyethylenic-functional monomer containing at least three ethylenically unsaturated groups selected from acrylyl and methacrylyl.

6. The system of claim 1 wherein the eyeglass lens is substantially free of distortions, cracks, patterns, and striations.

7. The system of claim 1 wherein the eyeglass lens is thicker than about 1.8 mm.

8. The system of claim 1 wherein the system is adapted to expose the composition to ultraviolet light of less than about ten milliwatts per square centimeter to form the lens.

9. The system of claim 1 wherein the lens has negligible haziness and negligible yellowing.

10. The system of claim 1 wherein the system is adapted to form a substantially clear eyeglass lens by exposing the composition to ultraviolet light while the composition is in the mold cavity formed in part by the first mold member with a non-casting face at a temperature less than about 50° C., and the second mold member with a noncasting face at a temperature less than about 50° C.

11. The system of claim 1, further comprising a gasket between the first and second mold members.

12. The system of claim 1 wherein the system is adapted to cure the composition to form a substantially clear eyeglass lens with a convergent power of at least +2 diopter, and a substantially clear eyeglass lens with a divergent power of greater than or equal to −1 diopter.

13. The system of claim 1 wherein the system is adapted to form a substantially clear eyeglass lens that is greater than 1.5 mm thick, that is substantially free of distortions, cracks, patterns and striations, and that has negligible yellowing and negligible haziness, all in less than thirty minutes by exposing the composition to less than ten milliwatts per square centimeter of ultraviolet light when in the mold cavity formed by a gasket, the first mold member with a noncasting face at a temperature less than about 50° C., and the second mold member with a noncasting face at a temperature less than about 50° C.

14. The system of claim 1 wherein the system is adapted to form a substantially clear eyeglass lens i n a time period of less than thirty minutes.

15. The system of claim 1 wherein the system is adapted to form a substantially clear eyeglass lens in a time period of between ten and thirty minutes.

16. The system of claim 1 wherein the system is adapted to cure the composition so that the composition, when cured, can be manually removed from the mold members in the absence of a mold release agent.

17. The system of claim 1 wherein the fight generator comprises a light source adapted to expose the composition to ultraviolet fight of less than about ten milliwatts per square centimeter to form the lens.

18. The system of claim 1 wherein at least 25% by weight of the composition comprises at least one polyethylenic-functional monomer containing at least two ethylenically unsaturated groups selected from acrylyl and methacrylyl, and wherein the composition is curable by exposure to ultraviolet light to form a substantially clear eyeglass lens in a time period of less than 30 minutes.

19. The system of claim 1 wherein the composition consists essentially of a photoinitiator, at least one polyethylenic-functional monomer containing at least three ethylenically unsaturated groups selected from acrylyl and methacrylyl, and less than about 30% by weight of the composition comprises an aromatic containing bis(allyl carbonate)-functional monomer.

20. The system of claim 1 wherein the composition is curable by exposure to ultraviolet light of less than about ten milliwatts per square centimeter to form the lens.

21. The system of claim 1 wherein the composition comprises less than about 1.02% by weight of a photoinitiator.

22. The system of claim 1 wherein about 10–75% by weight of the composition comprises 1,6 hexanediol dimethacrylate.

23. The system of claim 1 wherein about 10–75% by weight of the composition comprises tetraethylene glycol diacrylate.

24. The system of claim 1 wherein about 10–75% by weight of the composition comprises tripropylene glycol diacrylate.

25. The system of claim 1 wherein about 10–75% by weight of the composition comprises trimethylolpropane triacrylate.

26. The system of claim 1 wherein about 10–30% by weight of the composition comprises an aromatic bis(allyl-carbonate)-functional monomer.

27. The system of claim 1 wherein the composition is curable by exposure to ultraviolet light to form a substantially clear eyeglass lens in a time period of less than twenty minutes.

28. The system of any one of claims 20–26, wherein the composition is curable by exposure to ultraviolet light to form a substantially clear eyeglass lens in a time period of less than thirty minutes.

29. The system of any one of claims 20–26, wherein the composition is curable to form a substantially clear eyeglass lens that is greater than 1.5 mm thick, that is substantially free of distortions, cracks, patterns and striations, and that has negligible yellowing and negligible haziness, all in less than thirty minutes when exposed to less than ten milliwatts per square centimeter of ultraviolet light when in the mold cavity formed by a gasket the first mold member having a non-casting face at a temperature less than about 50° C., and the second mold member having a non-casting face at a temperature less than about 50° C.

30. The system of claim 1 wherein the composition comprises less than about 0.1% by weight of photoinitiator.

31. The system of claim 1 wherein the composition comprises less than about 0.04% by weight of photoinitiator, and wherein the composition is curable by exposure to ultraviolet light of less than about ten milliwatts per square centimeter to form the lens in a time period of less than about thirty minutes.

32. The system of claim 1 wherein the composition further comprises at least one polyethylenic functional monomer containing at least three ethylenically unsaturated groups selected from acrylyl and methacrylyl.

33. The system of claim 1 wherein at least 25% by weight of the composition comprises at least one polyethylenic-functional monomer containing at least two ethylenically unsaturated groups, and at least one polyethylenic-functional monomer containing at least three ethylenically unsaturated groups.

* * * * *

UNITED STATES PATENT AND TRADEMARK OFFICE
CERTIFICATE OF CORRECTION

PATENT NO. : 6,206,673 B1
DATED : March 27, 2001
INVENTOR(S) : N. Thornton Lipscomb, Omar M. Buazza It is certified that error appears in the above-identified patent and that said Letters Patent is hereby corrected as shown below:

Column 41, claim 1,
Line 50, please delete "15 mm" and substitute therefor -- 1.5 mm --.

Column 42, claim 1,
Line 11, please delete "d" and substitute therefor -- period --.

Column 42, claim 3,
Line 18, please delete "essential" and substitute therefor -- essentially --.

Column 42, claim 14,
Line 66, please delete "i n" and substitute therefor -- in --.

Column 43, claim 17,
Line 8, please delete "fight" and substitute therefor -- light --.
Line 10, please delete "fight" and substitute therefor -- light --.

Signed and Sealed this

Twentieth Day of November, 2001

*Attest:*

*Nicholas P. Godici*

NICHOLAS P. GODICI
*Attesting Officer*   *Acting Director of the United States Patent and Trademark Office*